(12) United States Patent
Mishima

(10) Patent No.: US 6,381,031 B1
(45) Date of Patent: Apr. 30, 2002

(54) COMPRESSION AND EXPANSION APPARATUS

(75) Inventor: Nobuhiro Mishima, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/115,904

(22) Filed: Jul. 15, 1998

(30) Foreign Application Priority Data

Jul. 16, 1997 (JP) ............................................. 9-191210

(51) Int. Cl.[7] ................................................. G06F 3/12
(52) U.S. Cl. ...................... 358/1.15; 358/1.16; 358/448
(58) Field of Search ............................. 358/1.13, 1.14, 358/1.15, 1.16, 1.17, 1.18, 426, 444, 445, 448, 452, 453, 462

(56) References Cited

U.S. PATENT DOCUMENTS

| | | | |
|---|---|---|---|
| 4,899,291 A | 2/1990 | Tsukada et al. | |
| 5,367,383 A | * 11/1994 | Godshalk et al. | ........... 358/455 |
| 5,491,557 A | 2/1996 | Nakajima et al. | |
| 5,574,834 A | * 11/1996 | Horie et al. | ............... 358/1.15 |
| 5,675,719 A | * 10/1997 | Matias et al. | ............... 358/1.16 |

* cited by examiner

Primary Examiner—Mark Wallerson
(74) Attorney, Agent, or Firm—McDermott, Will & Emery

(57) ABSTRACT

A compression/expansion apparatus has a plurality of compression/expansion processors for compressing or expanding image data. They are connected in parallel, and a data transfer controller controls data transfer with the plurality of compression/expansion processors. A setter sets each of the plurality of compression/expansion processors for compression or expansion according to input data transferred under the control by the data transfer controller. The number of compression/expansion processors used for compression and that used for expansion are changed according to a mode in order to improve efficiency of the processors.

16 Claims, 25 Drawing Sheets

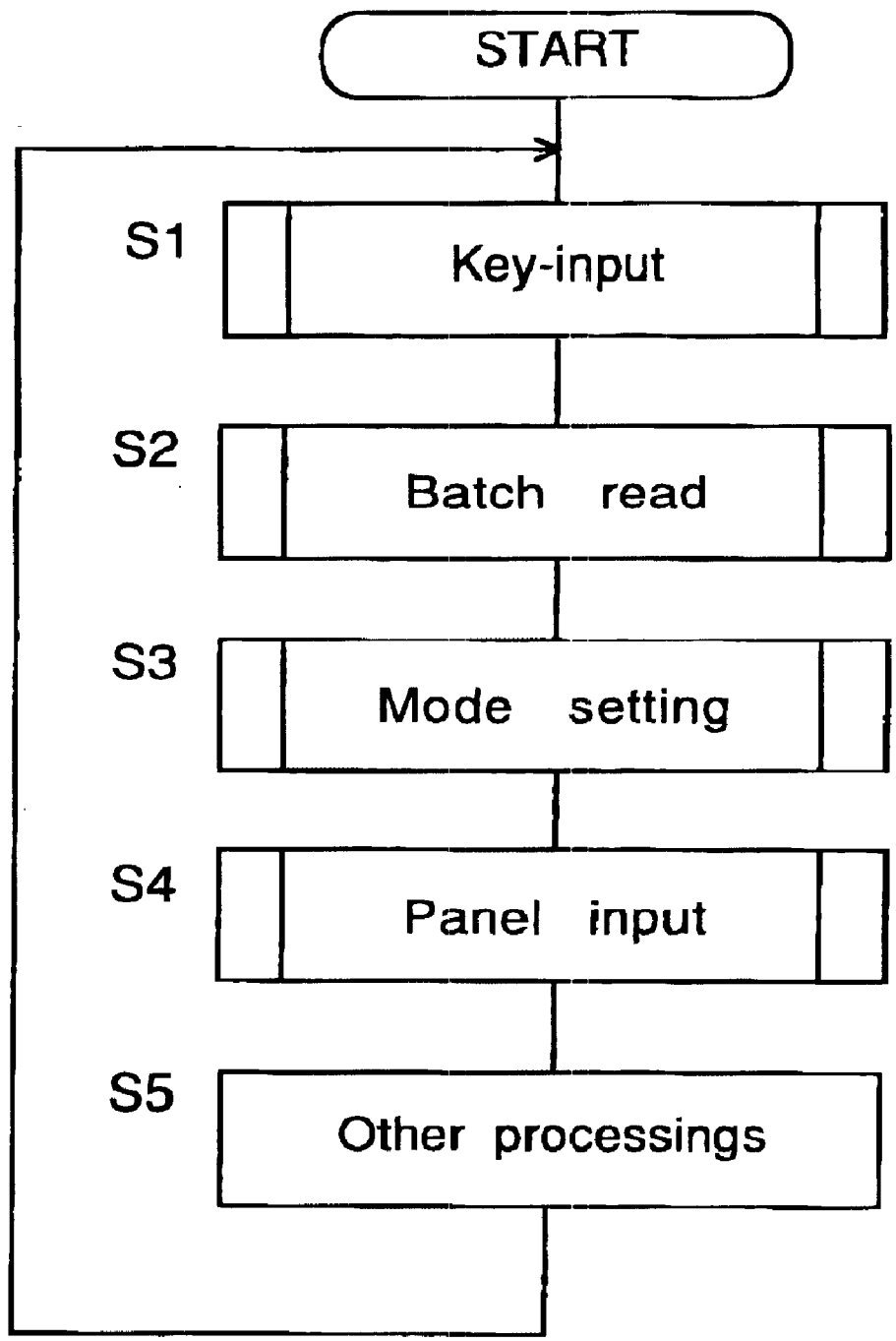

COMPRESSION AND EXPANSION APPARATUS

This application is based on applications No. 9-191210/1997 filed in Japan, the content of which is incorporated hereinto by reference.

BACKGROUND OF THE INVENTION

1. Field of the Invention

The present invention relates to an apparatus for compressing and expanding data.

2. Description of the Prior Art

An apparatus for compression and expansion is used, for example, in an image forming apparatus such as a digital copying machine. The apparatus receives image data from a reading means such as an image reader or from an external apparatus and stores them in a memory in a compressed state. Then, when requested, it reads the compressed data from the memory and expands them. The expanded data are sent as image data.

Circuits used for compression and for expansion have common portions, and they are usually provided in a single chip having two functions for compression and expansion (for example, QM-CODER, Model M65760 of Mitsubishi Electric). Such a chip is very expensive because the scale of its circuit is large.

FIG. 1 is a block diagram of a prior art compression and expansion apparatus 600. It receives bi-level image data from an image reader 580 and stores them temporarily through a data transfer section 601 in an input buffer memory 602. Then, the image data are sent through the data transfer section 601 to a compression processor 603, and the compression processor 603 compresses the image data to code data and sends the code data through a data transfer section 604 to a code memory 605. The code data in the code memory 605 are read, when requested, and sent through the data transfer section 604 to an expansion processor 606. The expansion processor 606 expands the code data to image data and sends the image data through a data transfer section 607 to an output buffer memory 608. Then, the image data in the output buffer memory 608 are sent through the data transfer section 607 to a printer 650. The data transfer sections 601, 604 and 607 are controlled by a central processing unit 610.

There are three data input/output states in the compression and expansion apparatus 600: A state where image data are only received, another state where image data are received and read at the same time, and a third state where image data are only read. For example, let us assume that a digital copying machine which can also be operated as an image reader and a printer for an external apparatus has the above-mentioned compression and expansion apparatus 600. When the digital copying machine is operated as a printer for an external apparatus, the compression and expansion apparatus 600 only reads image data. When the digital copying machine is operated as a copying machine, the compression and expansion apparatus 600 reads image data of a document and performs printing based on image data which have been read already. Therefore, the compression and expansion apparatus 600 receives and reads image data at the same time.

The performance of the entire compression/expansion apparatus 600 is low because use efficiency of the chip for compression and expansion is low. As mentioned above, the chip usually performs compression of data and expansion of the compressed data. However, in the compression and expansion apparatus 600, the compression processor 603 only compresses data, while the expansion processor 606 only expands data. Then, when image data are only received, and when image data are only read, one of the two chips for compression and expansion is not used. The data compression and expansion performed in the chips for compression and expansion are very slow if compared with the data transfer in the data transfer sections 601, 604 and 607. As shown in FIG. 2, in order to increase compression and expansion speed, a second compression operator 603 and a second expansion operator 606' may be added in parallel. Data are divided for the processing, and the compression/expansion speed by the apparatus is enhanced twice. However, even in this case, when image data are only received, and when image data are only read, a half of the four chips for compression and expansion is not used, and the performance of the entire compression and expansion apparatus is low.

SUMMARY OF THE INVENTION

An object of the present invention is to provide a compression and expansion apparatus which controls compression and expansion efficiently at low cost.

In a compression and expansion apparatus according to the invention, a plurality of compression/expansion processors connected in parallel are provided to compress or expand image data. A data transfer controller controls data transfer with the compression/expansion processors, and a setter sets each of the compression/expansion processors for compression or expansion according to input data transferred under the control by the data transfer controller. Thus, each compression/expansion processor is set for compression or expansion. When data are input, input data transferred to the compression/expansion processors which have been set for compression are compressed by them and stored in a memory device. When data are output, data transferred from the memory device to the compression/expansion processors which have been set for expansion are expanded by them and output to an external apparatus. Preferably, the setter performs the setting according to an amount of data to be compressed and an amount of data to be expanded. Preferably, the setter performs the setting according to an operation mode.

An advantage of the present invention is that data transfer is performed efficiently.

BRIEF DESCRIPTION OF THE DRAWINGS

These and other objects and features of the present invention will become clear from the following description taken in conjunction with the preferred embodiments thereof with reference to the accompanying drawings, and in which:

FIG. 12 is a main routine of the control by a controller;

DETAILED DESCRIPTION OF THE PREFERRED EMBODIMENTS

Figure 1:
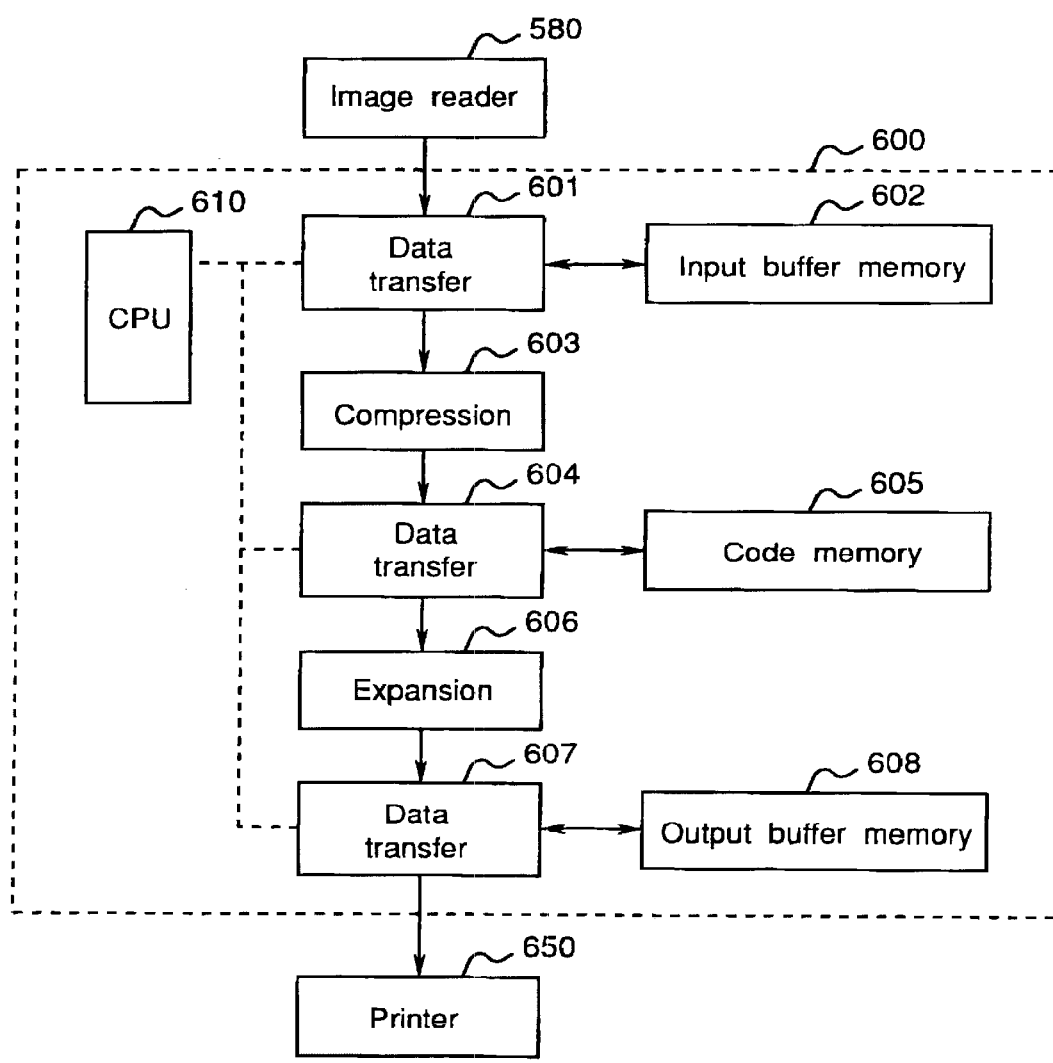
FIG. 1 is a block diagram of a prior art compression/expansion processor.

Referring now to the drawings, wherein like reference characters designate like or corresponding parts throughout the several views, FIG. 1 shows a structure of a copying machine according to an embodiment of the invention. The copying machine has an image reader 100 which reads image data of a document and a printer 200 which forms an image on a paper based on the image data read by the image reader 100.

Figure 3:
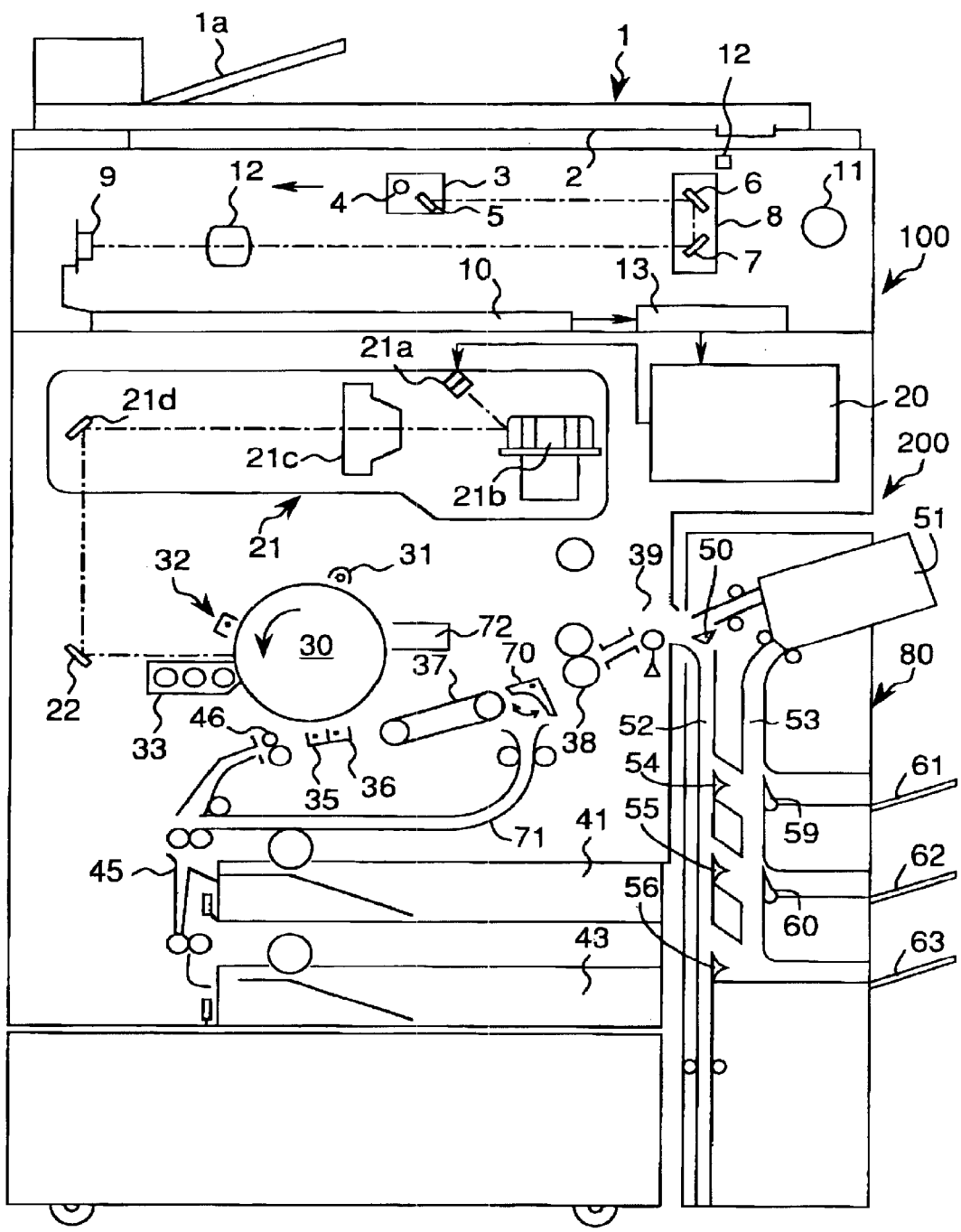
FIG. 3 is a sectional view of a copying machine of an embodiment of the invention.

In the image reader 100, an automatic document feeder 1 feeds one of documents put on a tray 1a sequentially onto a platen glass 2, and the document on the platen glass 2 is illuminated by a lamp mounted to a scanner 3. A light reflected from the document are guided by mirrors 5, 6 and 7 and a lens 12 to be focused onto a linear charge-coupled device (CCD) sensor 9. The linear sensor 9 has many photoelectric elements (CCD) along a main scan direction (perpendicular to the paper on which FIG. 3 is drawn), to read and send image data of a document at 400 dots per inch. A motor 11 moves the scanner 3 at a speed of V along a subscan direction as shown with an arrow in FIG. 3 to scan the entire document, while a mirror box 8 which mounts the mirrors 6 and 7 is moved in the same direction at a speed of V/2.

Figure 6:
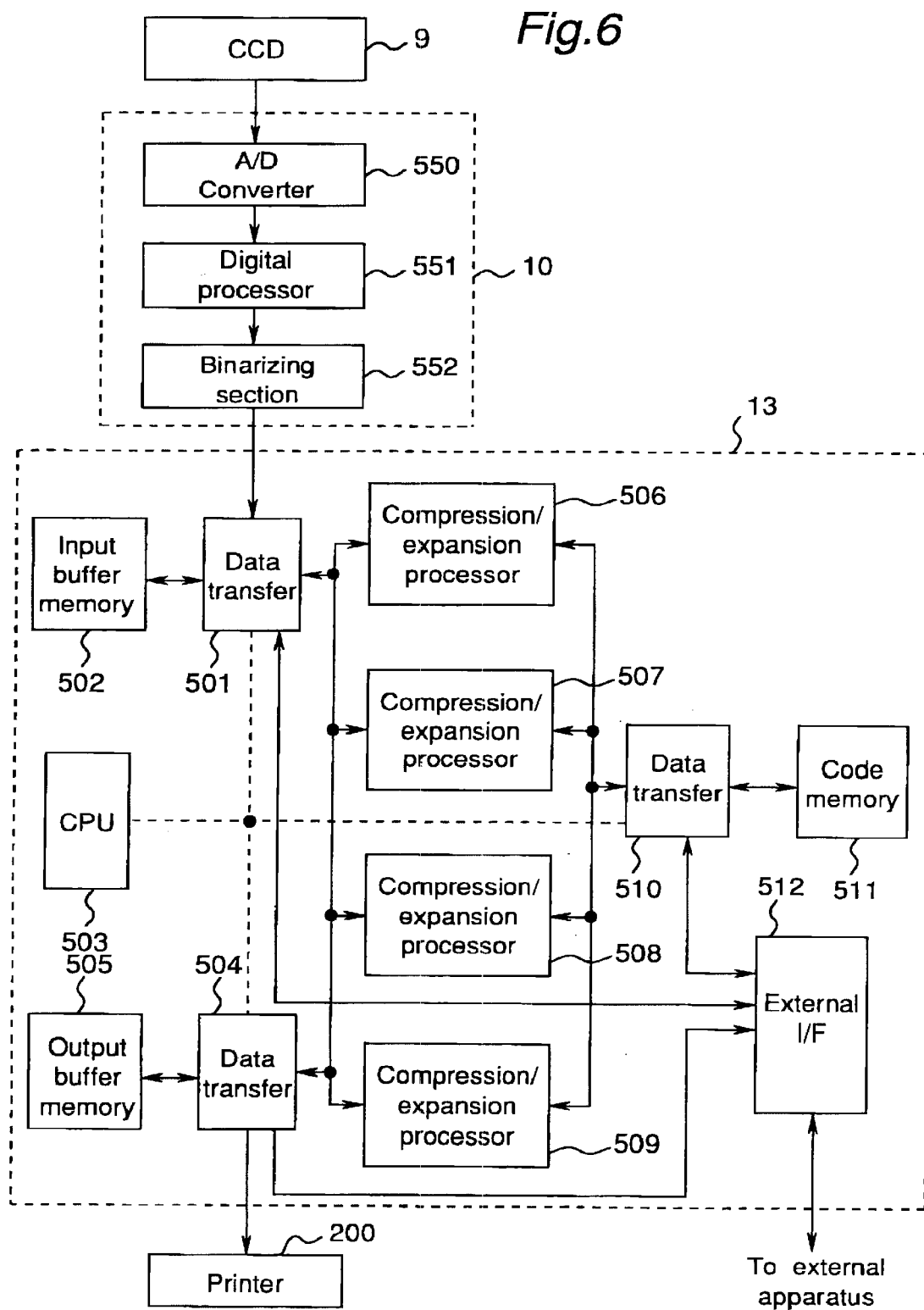
FIG. 6 is a block diagram of a control system in an image reader.

Signals output from the linear sensor 9 are binarize d by an image processor 10 and sent to a memory unit 13. The memory unit 13 compresses the bi-level data to code data, and the code data are stored in a code memory 511 therein (FIG. 6). If necessary, the code data are read from the code memory and expanded to image data to be sent to the printer 200.

In the printer 200, a print processor unit 20 receives the image data from the memory unit 13 and modulates them to supply the modulation data to a laser optical system 21. The laser optical system 21 has a laser diode 21a, a polygon mirror 21b, an f-θ lens 21c and a mirror 21d. The laser diode 21a is turned on or off to emit a laser beam according to the modulated image data. The laser beam is guided by the polygon mirror 21b, the fθ lens 21c, the mirror 21d and another mirror 22 to scan a photoconductor drum 30. The surface of the photoconductor drum 30 have been illuminated by an eraser lamp 31 and sensitized by a charger 21 uniformly before the exposure for each copy. When the photoconductor drum 30 is exposed in this state, an electrostatic latent image of a document is formed thereon. A developing unit 33 develops the latent image on the photoconductor drum 30 with toners. A paper is supplied from a paper cassette 41 or 43 and is carried by a timing roller 46 towards a transfer charger 35. The toner image on the photoconductor drum 30 is transferred by the transfer charger 35 onto the paper, and the paper is separated by a separation and discharge charger 36 from the photo conductor drum 30. Then, the paper is carried through a carriage belt 37, a fixing device 38 and a discharge roller 39 to a discharge unit 80. Toners remained on the photoconductor drum 30 is removed by a cleaner 72. When printing is performed on two sides of a paper, the paper is guided by a claw 70 through a re-feed path 72 to the timing roller 46.

The discharge unit 80 sends the papers to predetermined positions according to a mode. In non-sort, sort and weekly binding modes, a paper is guided by the claw 50 to a first re-carriage path 52. In non-sort mode, the paper in the first re-carriage path 52 is discharged on a tray 61 by a claw 54. In sort and weekly binding modes, the paper in the first re-carriage path 52 is discharged on a tray 61, 62 or 63 by a claw 54, 55 or 56. In staple sort mode, the paper is inserted into a staple unit 51. For example, after a predetermined number of papers are inserted in the staple unit 51, they are stapled and sent to a secondre-carriage path 53. The paper in the second re-carriage path 53 is discharged on the tray 61, 62 or 63 by the claw 54, 55 or 56.

Figure 4:
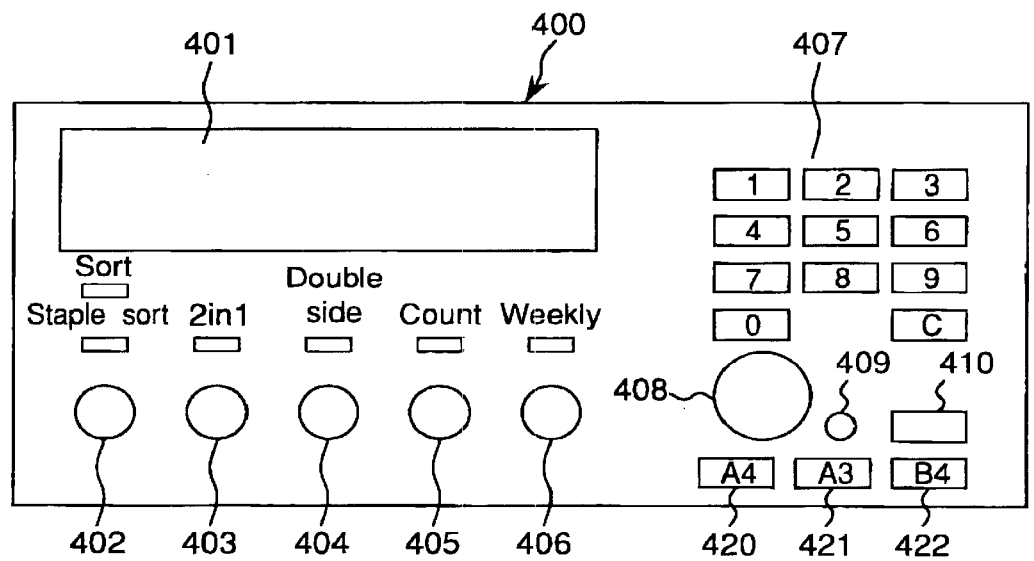
FIG. 4 is a front view of an operation panel.

FIG. 4 shows an operation panel 400. A liquid crystal display device 401 displays statuses of the copying machine such as copy mode and copy number. A key 402 sets non-sort mode, sort mode or staple-sort mode cyclically. A key 403 sets 2-in-1 mode wherein images of two pages are printed on a single paper. A key 404 sets double-side copy mode or single-side copy mode. A key 405 sets a mode to count a number of documents. A key 406 sets weekly binding mode. Numeral keys 407 are provided to set a number such as copy number or copy magnifying power. Start key 408 starts a copy job, and stop key 409 stops a copy job. Reset key 410 resets a mode which have been set. A key 420, 421 or 422 sets a size of paper of A4, A3 or B4.

Figure 5:
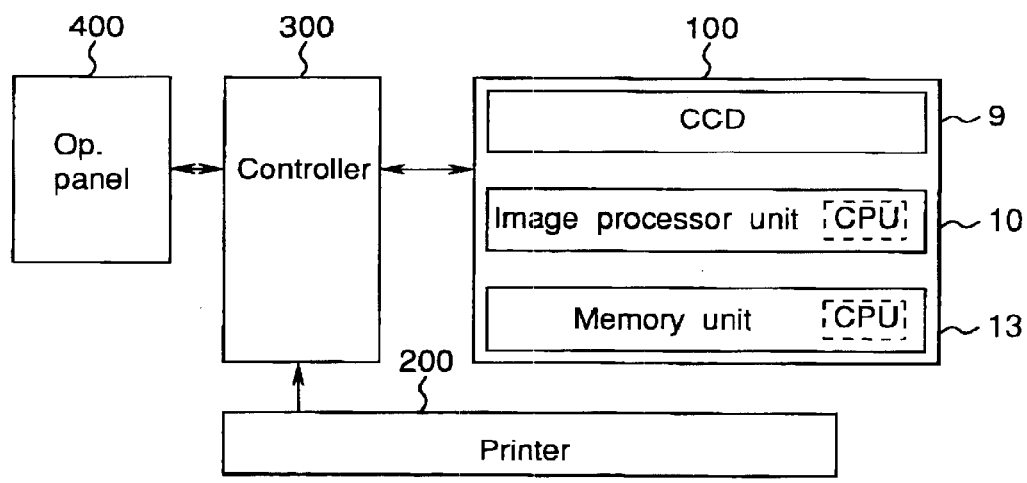
FIG. 5 is a block diagram of a control system of the copying machine.

FIG. 5 shows a control system of the copying machine. A controller 300 is connected to the image reader 100, the printer 200 and the operation panel 400, and commands and requests are transmitted between them. The controller 300 receives key-inputs from the operation panel 400 and controls the entire system according to the key-inputs such as mode setting. In the image reader 100, the image processing unit 10 changes analog image signals read by the CCD linear sensor 9 to bi-level digital data. The memory unit 13 compresses the bi-level digital data to code data, and the code data are stored in a code memory 511. If necessary, the code data are read and expanded, and the expanded data are set to the printer 200.

FIG. 6 shows a control system in the image reader 100. In the image processing unit 10, an analog-to-digital converter 550 receives analog document image signals from the CCD linear sensor 9 and converts them to digital data. A digital processor 551 processes the digital data for shading correction and the like. A binarizing section 552 receives the digital data and binarizes them.

Next, in the memory unit 13, the bi-level image data received from the image processing unit 10 are stored through a data transfer processor 501 in an input buffer memory 502. Four compression/expansion processors 506–509 are connected in parallel to each other and performs compression or expansion according to the setting by a central processing unit (CPU) 503. The data transfer processor 501 divides one page of image data stored in the input buffer memory 502 and sends them to compression/expansion processors designated by the CPU 503 to perform compression among the four processors 506–509. The designated compression/expansion processors compresses the image data to code data, and the code data are sent through a data transfer processor 510 to a code memory 511. The code memory 511 stores the code data. The data transfer processor 510 reads code data in the code memory 511 and sends them to compression/expansion processors designated by the CPU 503 to perform expansion in the four processors 506–509. The designated compression/expansion processors expand the code data to image data, and the image data are sent through a data transfer processor 504 to an output buffer memory 505. The output buffer memory 505 stores one page of image data and sends them through the data transfer processor 504 to the printer 200.

As mentioned above, the central processing unit (CPU) 503 sets the four compression/expansion processors 506–509 for compression or expansion. The CPU 503 sets internal registers in the data transfer processors 501, 504 and 510 and in the compression/expansion processors 506–509 according to a relationship between an amount of data inputted to the memory unit 13 and that outputted from the memory unit 13 determined according to the content of a copy job In the setting, the number of the compression/expansion processors 506–509 for compression and that of expansion are changed appropriately for the most efficient data transfer.

In concrete, when image data are only stored in the memory unit 13, all the compression/expansion processors 506–509 are set for compression. When image data are stored in and read from the memory unit 13 at the same time, two of the compression/expansion processors 506–509 are set for compression, while the remaining two are set for expansion. This setting assumes that an amount of data inputted to the memory unit 13 is equal to that outputted from the memory unit 13. However, an amount of data inputted to the memory unit 13 is larger than that outputted from the memory unit 13, for example, when the code data written to the code memory 511 is read while thinning them or when a copy job to output the code data of only even pages is set. In such cases, for example, three of the compression/expansion processors 506–509 are set for compression, while the remaining one is set for expansion. When image data are only read, all the compression/expansion processors 506–509 are set for expansion.

For example, it is assumed here that M copies of N documents are printed where M and N are natural numbers. When sort mode is set, all the compression/expansion processors 506–509 are set for compression, and image data a first document is read. For the second to last documents, two of the compression/expansion processors 506–509 are set for compression to read image data, while the other two thereof are set for expansion to read the code data. After the N documents have been read, all the compression/expansion processors 506–509 are set for expansion until the M copies are produced.

When weekly binding mode or staple mode is set, all the compression/expansion processors 506–509 are set for compression until all the N documents have been read. Next, all the compression/expansion processors 506–509 are set for expansion until the M copies are produced.

The CPU 503 sends control signals to the data transfer processors 501, 504, 510 to enable data transfer (direct memory access). Table 1 shows the contents of data transfer performed by the data transfer processor 501, 504, 510, that is, starting part to read data and destination part to send data when data transfer DMA-I to DMA-I is performed. For example, when the CPU 503 enables data transfer DMA-1, image data are transferred from the input section (starting part) to the input buffer memory 502 (destination part).

TABLE 1

| | Contents of data transfer | |
|---|---|---|
| | Start | Destination |
| DMA-1 | Input section | Input buffer memory 502 |
| DMA-2 | Input buffer memory 502 | Comp/exp processor 506 |
| DMA-3 | Input buffer memory 502 | Comp/exp processor 507 |
| DMA-4 | Input buffer memory 502 | Comp/exp processor 508 |
| DMA-5 | Input buffer memory 502 | Comp/exp processor 509 |
| DMA-6 | Comp/exp processor 506 | Code memory 511 |
| DMA-7 | Comp/exp processor 507 | Code memory 511 |
| DMA-8 | Comp/exp processor 508 | Code memory 511 |
| DMA-9 | Comp/exp processor 509 | Code memory 511 |
| DMA-A | Code memory 511 | Comp/exp processor 506 |
| DMA-B | Code memory 511 | Comp/exp processor 507 |
| DMA-C | Code memory 511 | Comp/exp processor 508 |
| DMA-D | Code memory 511 | Comp/exp processor 509 |
| DMA-E | Comp/exp processor 506 | Output buffer memory 505 |
| DMA-F | Comp/exp processor 507 | Output buffer memory 505 |
| DMA-G | Comp/exp processor 508 | Output buffer memory 505 |
| DMA-H | Comp/exp processor 509 | Output buffer memory 505 |
| DMA-I | Output buffer memory 505 | Output section |

The data transfer processor 501 is connected to the input section, the input buffer memory and the four compression/expansion processors 506–509, and it performed data transfer DMA-1 to DMA-5. The data transfer processor 510 is connected to the four compression/expansion processors 506–509 and the code memory 511, and it performed data transfer DMA-6 to DMA-D. The data transfer processor 504 is connected to the input buffer memory and the four compression/expansion processors 506–509, the out put buffer memory 505 and the out put section, and it performs data transfer DMA-E to DMA-I. Further, the data transfer processors 501, 504 and 510 transmit data through the external interface 512 to and from an external apparatus. When the digital copying machine is used as the image reader for the external apparatus, the data transfer processor 501 sends image data of a document read by the image reader 100 through the external interface 512 to the external apparatus, or the data transfer processor 510 sends code data through the external interface 512 to the external apparatus. On the other hand, when the digital copying machine is used as the printer for an external apparatus, image data received through the external interface 512 from the external apparatus are sent to the data transfer processor 501 and are compressed to be stored in the code memory 501 or the image data are directly sent through the data transfer processor 504 to the printer 200.

Figure 7:
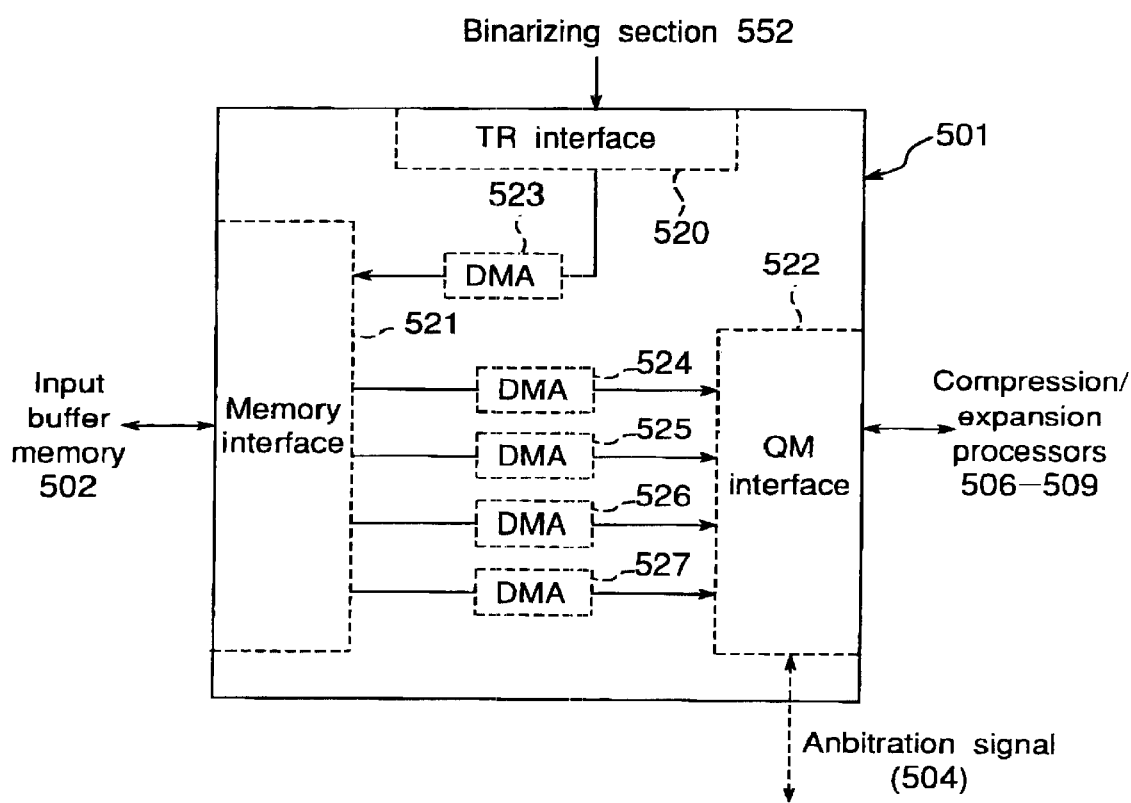
FIG. 7 is a block diagram of a data transfer processor.

FIG. 7 shows the data transfer processor 501. An image reader (IR) interface 520 receives data from the binarizing section 552. A memory interface 521 performs arbitration of DMAs and access (read/write) to the input buffer memory 502. A QM interface 523 allows data transfer to the compression/expansion chip 506–509 according to the setting of DMAs 524–527 and performs arbitration according to a request from the compression/expansion processor 506–509. The DMA 523 performs data transfer DMA-1 from the IR interface 520 to the memory interface 521. The DMAs 524–527 perform data transfer DMA-2 to DMA-5 from the memory interface 521 to the QM interface 522. The CPU 503 sets an amount of data to be transferred and transfer commands, and each DMA 524–527 sends a transfer end signal to the CPU 503. The DMAs 524–527 can perform parallel processing with time sharing on all the channels set by the CPU 503. Arbitration is performed in the priority order of DMA 523, DMA 524, DMA 525, DMA 526 and DMA 527. The QM interface 522 sends an arbitration signal to a QM interface 532 (FIG. 8) of the data transfer processor 504 in order to share the compression/expansion image data bus commonly with the data transfer processor 504.

Figure 8:
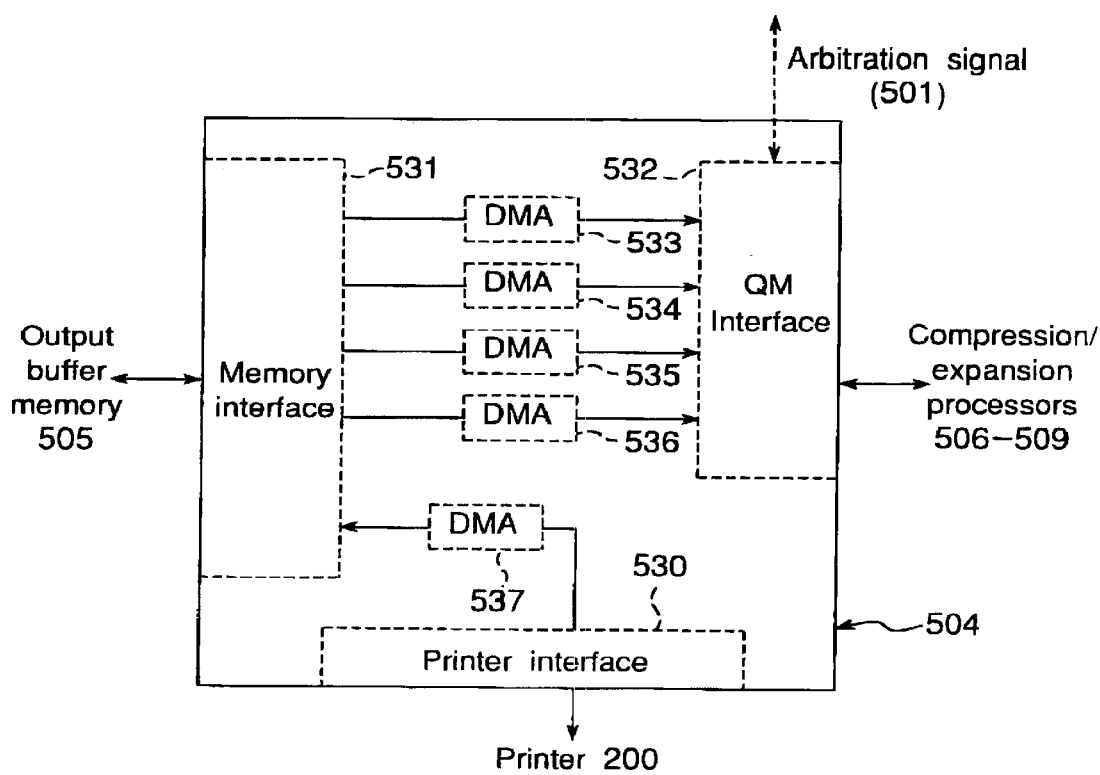
FIG. 8 is a block diagram of another data transfer processor.

FIG. 8 shows the data transfer processor 504. A printer interface 530 receives data from the binarizing section 552. A memory interface 531 performs arbitration of DMAs and access (read/write) to the output buffer memory. A QM interface 532 performs arbitration for requests to the compression/expansion processors 506–509 according to the setting of DMAs 533–536. The DMA 537 performs data transfer DMA-I from the memory interface 531 to the printer interface 530. The DMAs 533–536 perform data transfer DMA-E to DMA-H from the QM interface 532 to the memory interface 531. The CPU 503 sets an amount of data to be transferred and transfer commands, and each DMA 533–536 sends a transfer end signal to the CPU 503. The DMAs 533–536 can perform parallel processing with time sharing on all the channels set by the CPU 503. Arbitration is performed in the priority order of DMA 537, DMA 533, DMA 534, DMA 535 and DMA 536. The QM interface 532 sends an arbitration signal to the QM interface 522 (FIG. 7) of the data transfer processor 501 in order to share the compression/expansion image data bus commonly with the data transfer processor 501.

Figure 9:
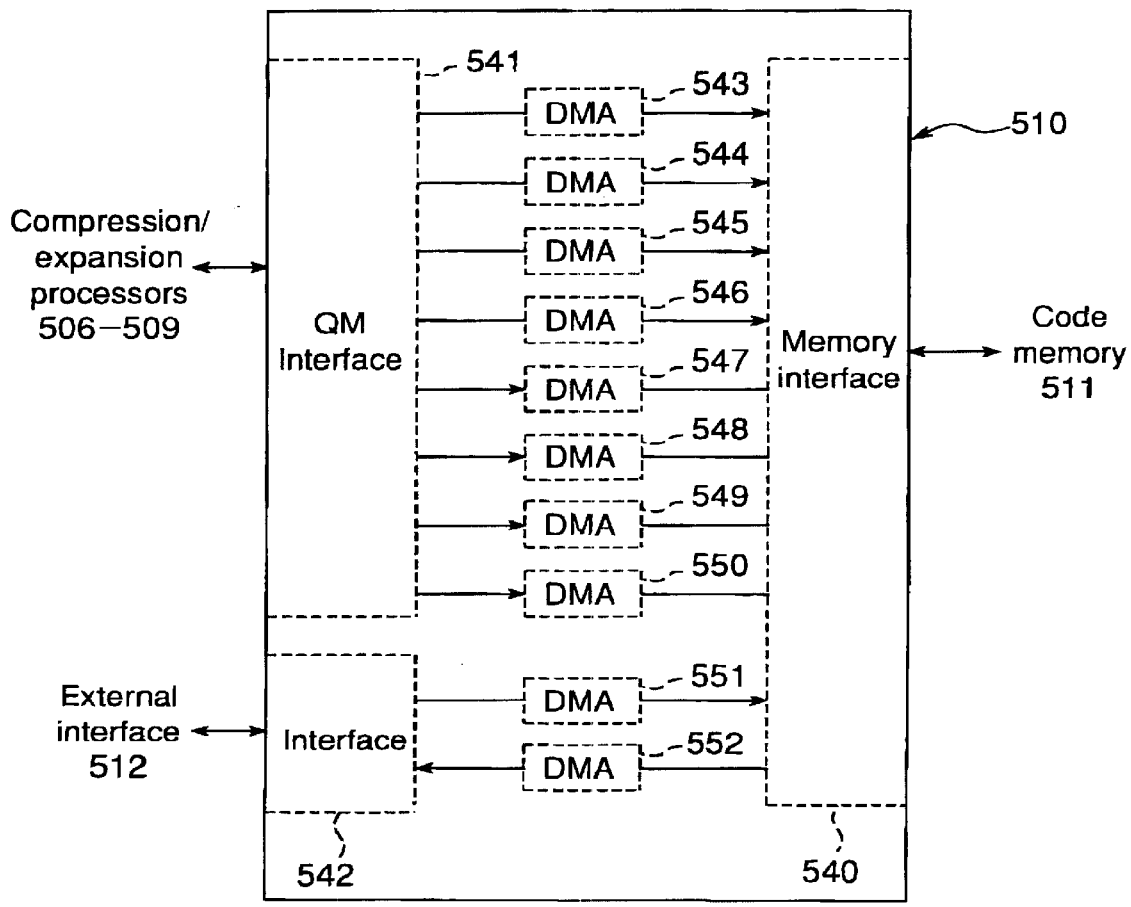
FIG. 9 is a block diagram of a further data transfer processor.

FIG. 9 shows the data transfer processor 510. A memory interface 54 performs arbitration of DMAs 543–552 and access (read/write) to the code memory. A QM interface 541 allows data transmission to and from compression/expansion processors 506–509 and performs arbitration for requests to the compression/expansion processors 506–509, according to the setting of DMA 543–550. An interface 542 performs access to the external interface 512. The DMAs 543–546 perform data transfer DMA-6 to DMA-9 from the QM interface 540 to the memory interface 541. The CPU 503 sets an amount of data transfer and transfer commands, and each DMA 543–546 sends transfer end signal to the CPU 503. The DMAs 547–550 perform data transfer DMA-A to DMA-D from the memory interface 541 to the QM interface 540 The CPU 503 sets an amount of data to be transferred and transfer commands, and each DMA 547–550 sends a transfer end signal to the CPU 503. A DMA 551 performs data transfer DMA-J from the interface 542 to the memory interface 540, and a DMA 552 performs data transfer DMA-K from the memory interface 540 to the interface 542. The CPU 503 sets an amount of data to be transferred and transfer commands, and each DMA 551, 552 sends a transfer end signal to the CPU 503. The DMAs 543–552 can perform parallel processing with time sharing on all the channels set by the CPU 503. Arbitration is performed in the priority order of DMA 543, DMA 544, DMA 545, DMA 546, DMA 547, DMA 548, DMA 549, DMA 550, DMA 551 and DMA 522.

Figure 10:
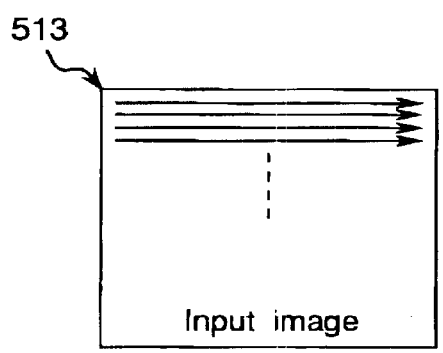
FIG. 10 is a diagram of image data stored in an input buffer memory.

FIG. 10 shows image data stored in the input buffer memory 502. The image data are input sequentially from an input reference position 513 along luster scan direction.

Figure 11:
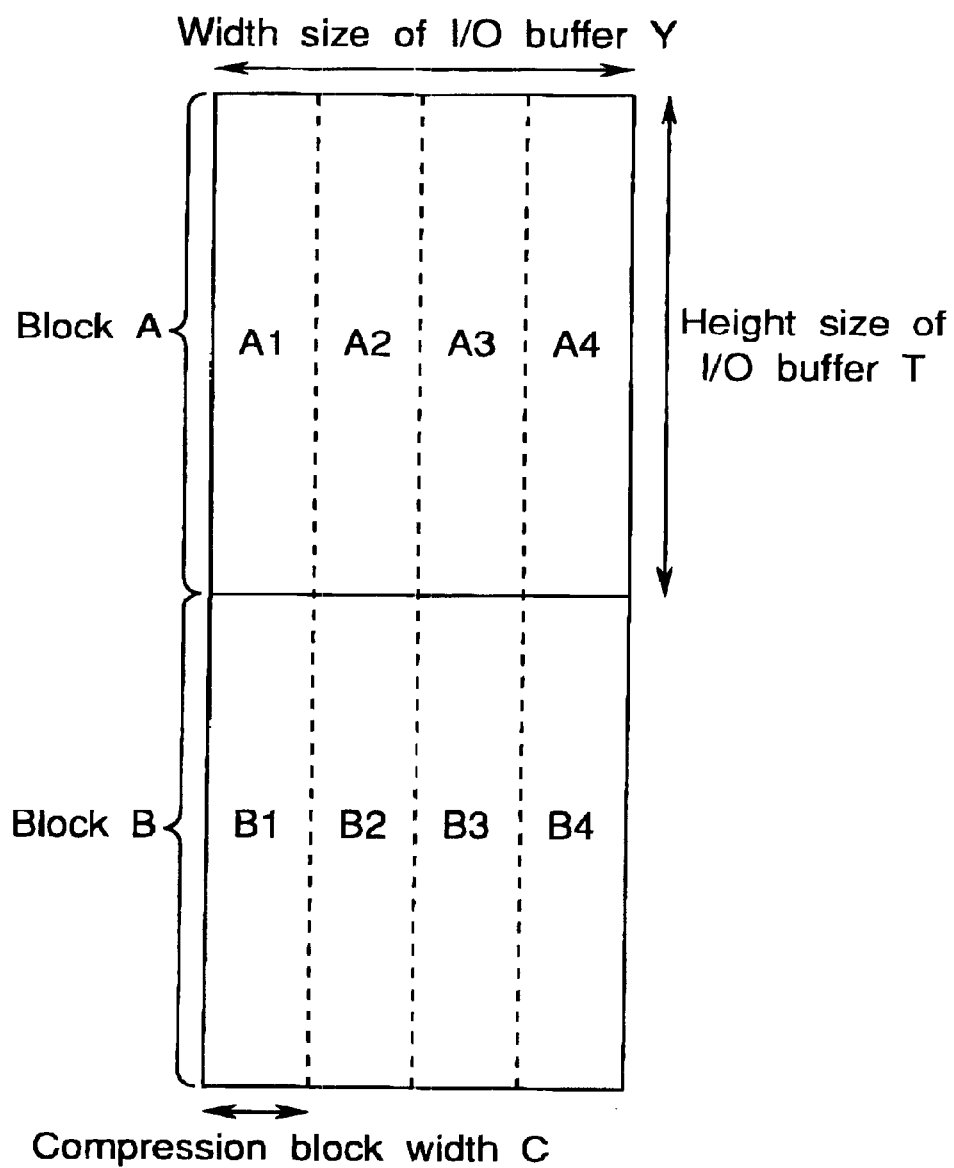
FIG. 11 is a diagram of data storage areas in the input buffer memory and in an output buffer memory.

FIG. 11 shows data storage areas in the input buffer memory 502 and in the output buffer memory 505. The data transfer processors 501 and 504 manage image data with two-dimensional addresses, and data transfer is performed according to width size Y, height size T of paper used for image forming, and a value of compression block width C based on process efficiency in the compression/expansion processors 506–509. The width size Y is set in the unit of dot (usually as a multiple of eight) and the height size T is set in the unit of line. If the resolution is 400 dots per inch and the paper size is A4 to be put longitudinal in vertical direction, the width size y of the input/output buffer is 3,328 dots (210 mm) and the compression block width C is 832 dots (52.5 mm). The input buffer memory 502 and the output buffer memory 505 has data storage area that is twice the height size of the paper.

When data transfer DMA-1 is performed, the width size Y and the height size T of the input/output buffer memories are set to the data transfer processor 501. When data transfer DMA-2 and DMA-6, DMA-3 and DMA-7, DMA-4 and DMA-8, or DMA-5 and DMA-9 using block compression are performed, the height size T of the output buffer and the compression block width C are set to the data transfer processor 501. When data transfer DMA-E and DMA-A, DMA-F and DMA-B, DMA-G and DMA-C, or DMA-H and DMA-D using block expansion are performed, the height size T of the input/output buffer memories and the compression block width C are set to the data transfer processor 504. When data transfer DMA-I including output to the printer is performed, the width size Y of the output buffer and the height size T of the input/output buffer memories are set to the data transfer processor 504.

When data transfer is performed, the data storage area is halved, and they are managed as blocks A and B. In the actual data transfer, the blocks A and B are further divided to sub-blocks A1–A4 and B1–B4 with use of the compression block width C which is the unit processed by the compression/expansion processors. For example, the blocks are managed as follows. When data are written to the input buffer memory 502 continuously, data is written to the block A while data are read from the block B; after data are written completely to the block A, the written data are read while data are written to the block B. Thus, the time to write data to the input buffer memory 502 and to the output buffer memory 505 is omitted, and data transfer is performed efficiently.

Next, the data transfer control by the controller 300 is explained. FIG. 12 shows a main routine of the controller 300. First, key-inputs from the operation panel 400 are processed (step S1, refer to FIGS. 13A and 13B). Then, batch read setting is set if necessary to read images of documents put on the tray 1a in the automatic document feeder 1 in a batch process (step 32, refer to FIG. 14). Next, a mode is set (step S3, refer to FIG. 15), and panel inputs are processed (step S4, refer to FIG. 16). After other processings such as image processing are performed, the flow returns to step S1.

Figure 13A:
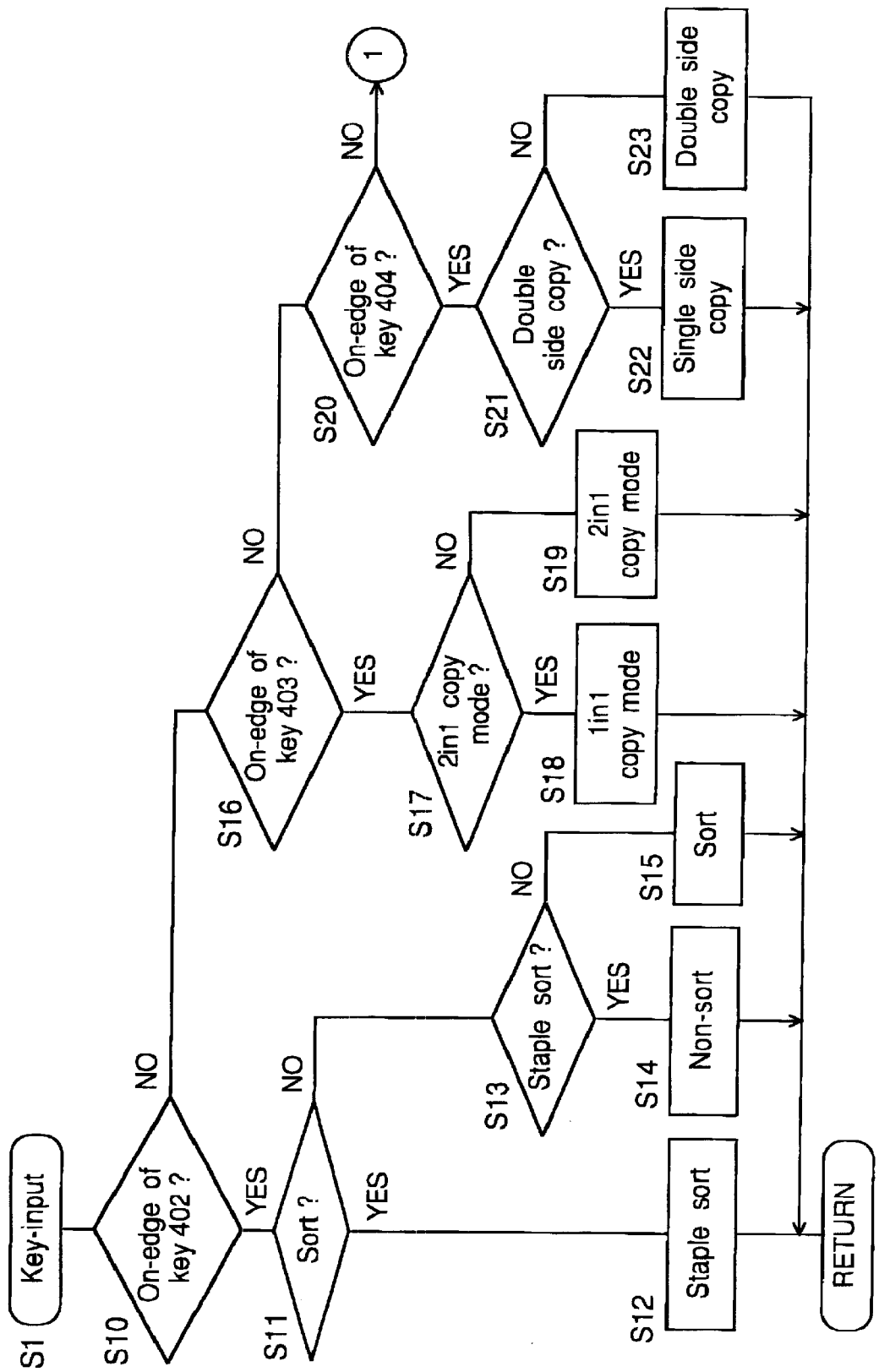
FIGS. 13A and 13B show a flowchart of the key-input processing.
Figure 13B:
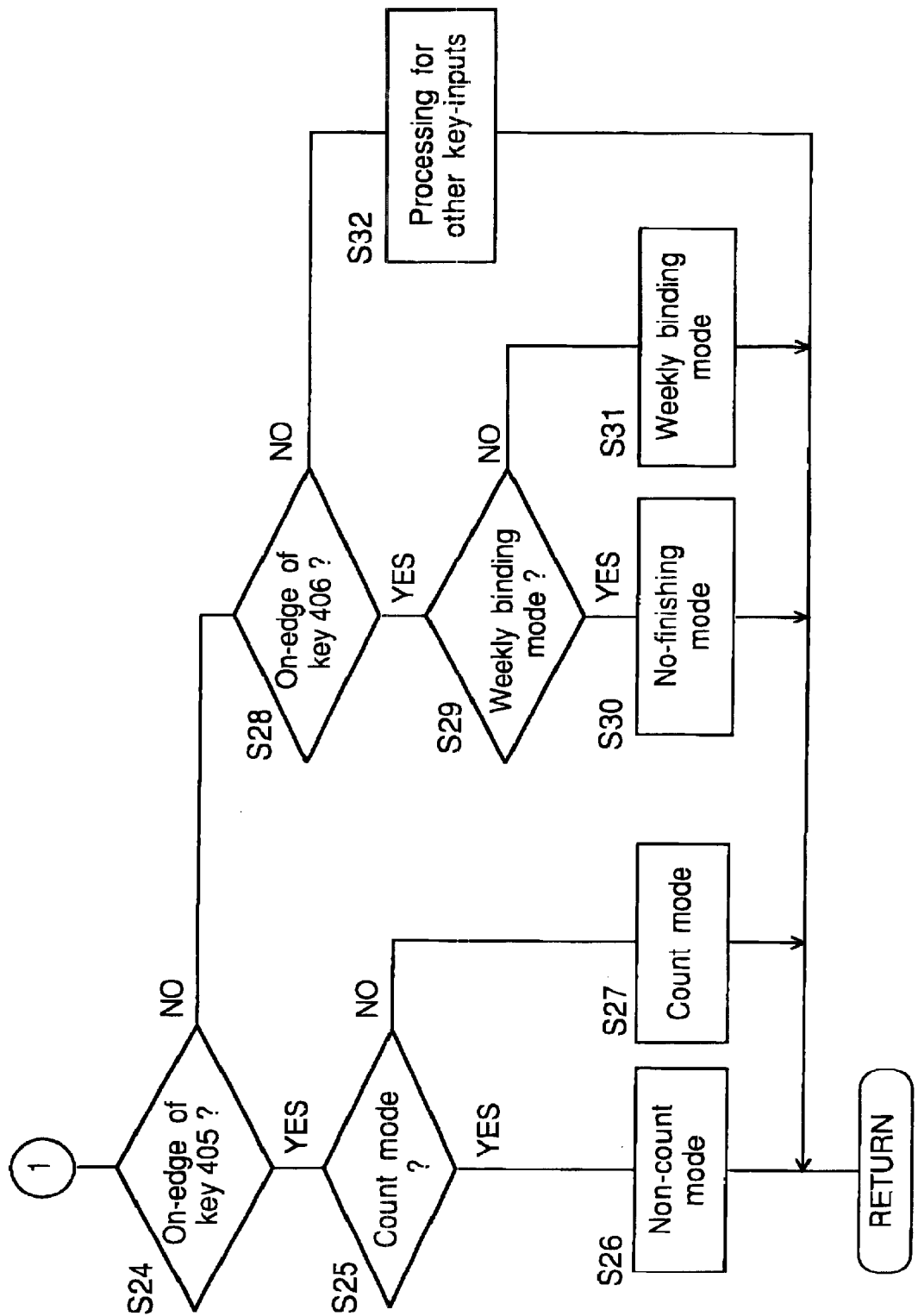

FIGS. 13A and 13B show a flowchart of the key-input processing (step S1 in FIG. 12) wherein key-inputs from the operation panel 400 are processed. When the key 402 in the operation panel 400 is decided to be pressed (YES at step S10), if sort mode has been set (YES at step S11), stable sort mode is set (step S12), if stable sort mode has been set (YES at step S13), non-sort mode is set (step S14), and if non-sort mode is has been set (NO at step S13), sort mode is set (step S15).

When the key 403 in the operation panel 400 is decided to be pressed (YES at step S16), if 2-in-1 mode for forming two pages of image in a paper has been set (YES at step S17), 1-in-1 mode for forming one page of image in a paper is set (step S18), and if 2-in-1 mode has not been set (NO at step S17), 2-in-1 mode is set (step S19).

When the key 404 in the operation panel 400 is decided to be pressed (YES at step S20), if double side copy mode has been set (YES at step S21), single side copy mode is set (step S22), and if double-side copy mode has not been set (NO at step S21), double-side copy mode is set (step S23).

When the key 405 in the operation panel 400 is decided to be pressed (YES at step S24), if count mode for counting the number of documents in the tray 1a has been set (YES at step S25), non-count mode for not counting the number of documents is set (step S26), and if count mode has not been set (NO at step S25), count mode is set (step S27).

When the key 406 in the operation panel 400 is decided to be pressed (YES at step S28), if weekly binding mode has been set (YES at step 529), non-finishing mode is set (step S30), and if weekly binding mode has not been set (NO at step S29), weekly binding mode is set (step S31).

When a key other than the keys 402–406 is decided to be pressed (NO at step S28), processing therefor is performed (step S32).

Figure 14:
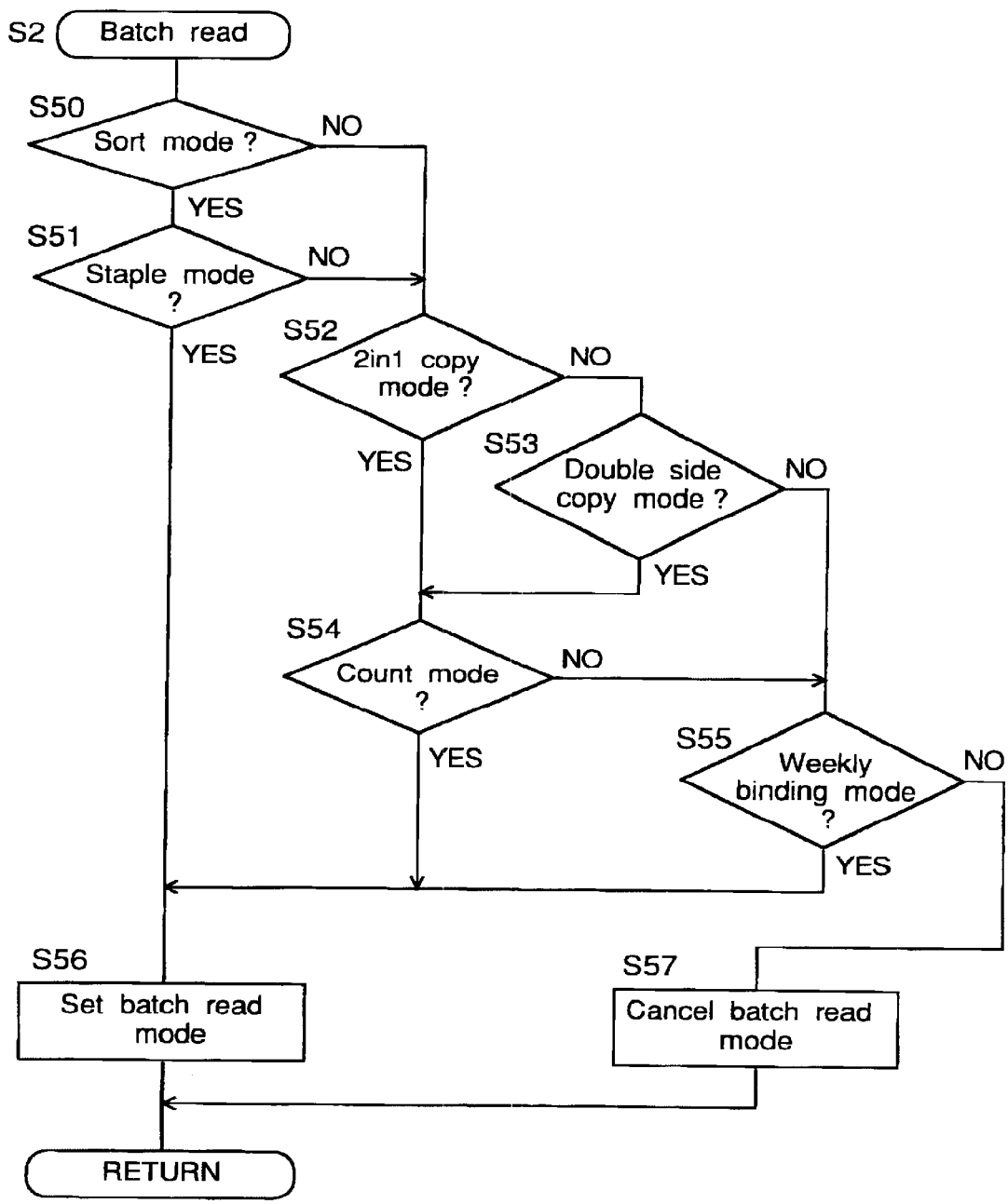
FIG. 14 is a flowchart of batch read processing.

FIG. 14 shows a flowchart of batch read processing (step S2 in FIG. 12) wherein it is decided whether document set in the tray 1a are read in a batch processing according the mode set in the key-input processing (step S1 in FIG. 12). Batch read mode is set (step 556) when staple sort mode is decided to be set (YES at steps S50 and S51), when 2-in-1 copy mode and count mode are set at the same time (YES at steps S52 and S54), when double-side copy mode and count mode are set at the same time (YES at steps S53 and S54), or when weekly binding mode is set (YES at step S55). Batch read mode is cancelled (step S57) in other cases, for example, when 2-in-1 mode is set but count mode is not set, or when single-side copy mode is set but weekly binding mode is not set. That is, a normal read mode is set wherein document reading in the image reader 100 is performed at the same time as printing in the printer 200.

Figure 15:
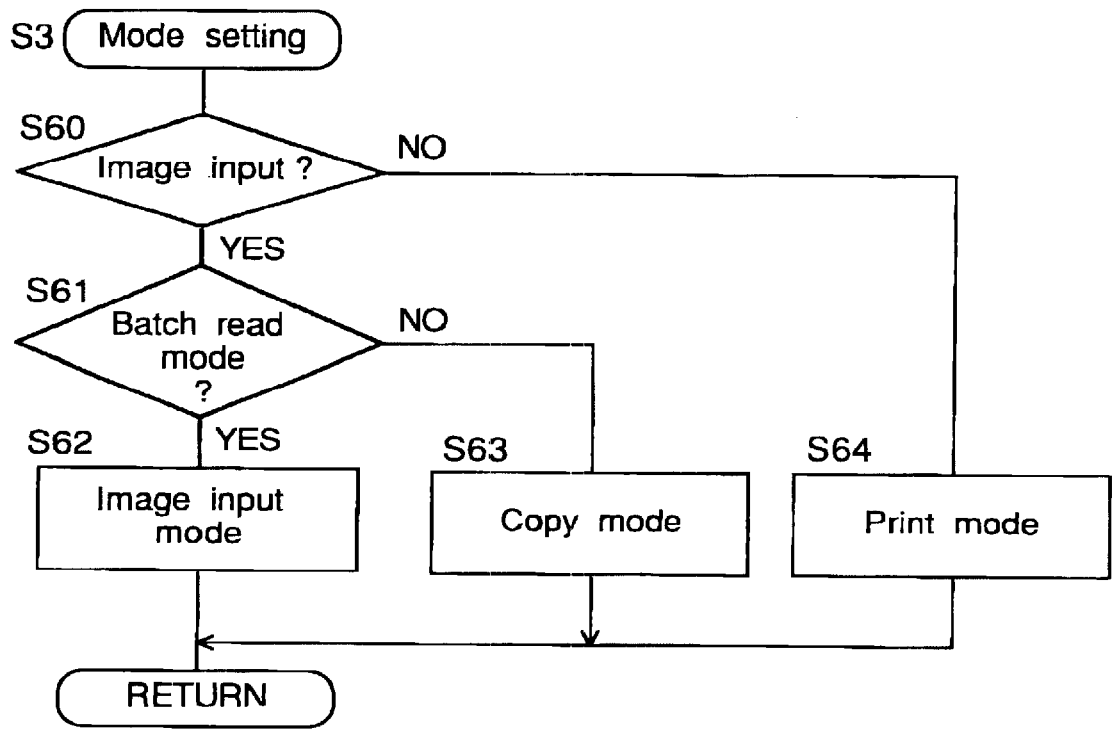
FIG. 15 is a flowchart of mode setting.

FIG. 15 shows a flowchart of mode setting (step S3 in FIG. 3. When image data are input (YES at step S60) and batch read mode is set (YES at step S61), image input mode is set to read image data of the documents continuously by the image reader 100. When image data are input (YES at step S60) but batch read mode is not set (NO at step S61), a copy mode is set to read image data of a document by the image reader 100 and to send data to the printer 200 (step S63). On the other hand, when image data are not input (NO at step S60), print mode is set only to send image data to the printer 200 (step S64).

Figure 16:
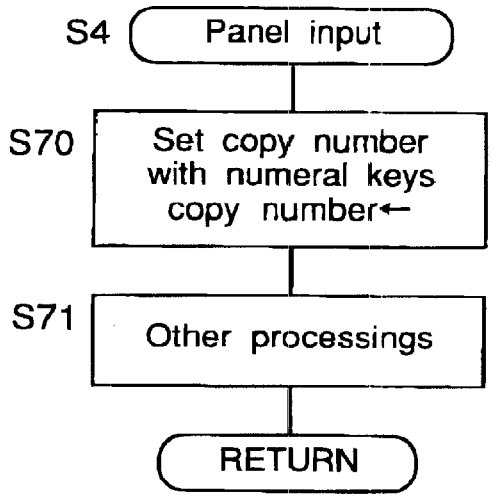
FIG. 16 is a flowchart of panel input processing.

FIG. 16 shows a flowchart of panel input processing (step S4 in FIG. 12). A number of copies set by the numeral keys 407 in the operation panel 400 is received and it is set to a variable, copy number (step S70). Then other processing for other panel inputs are processed (step S71).

Figure 17:
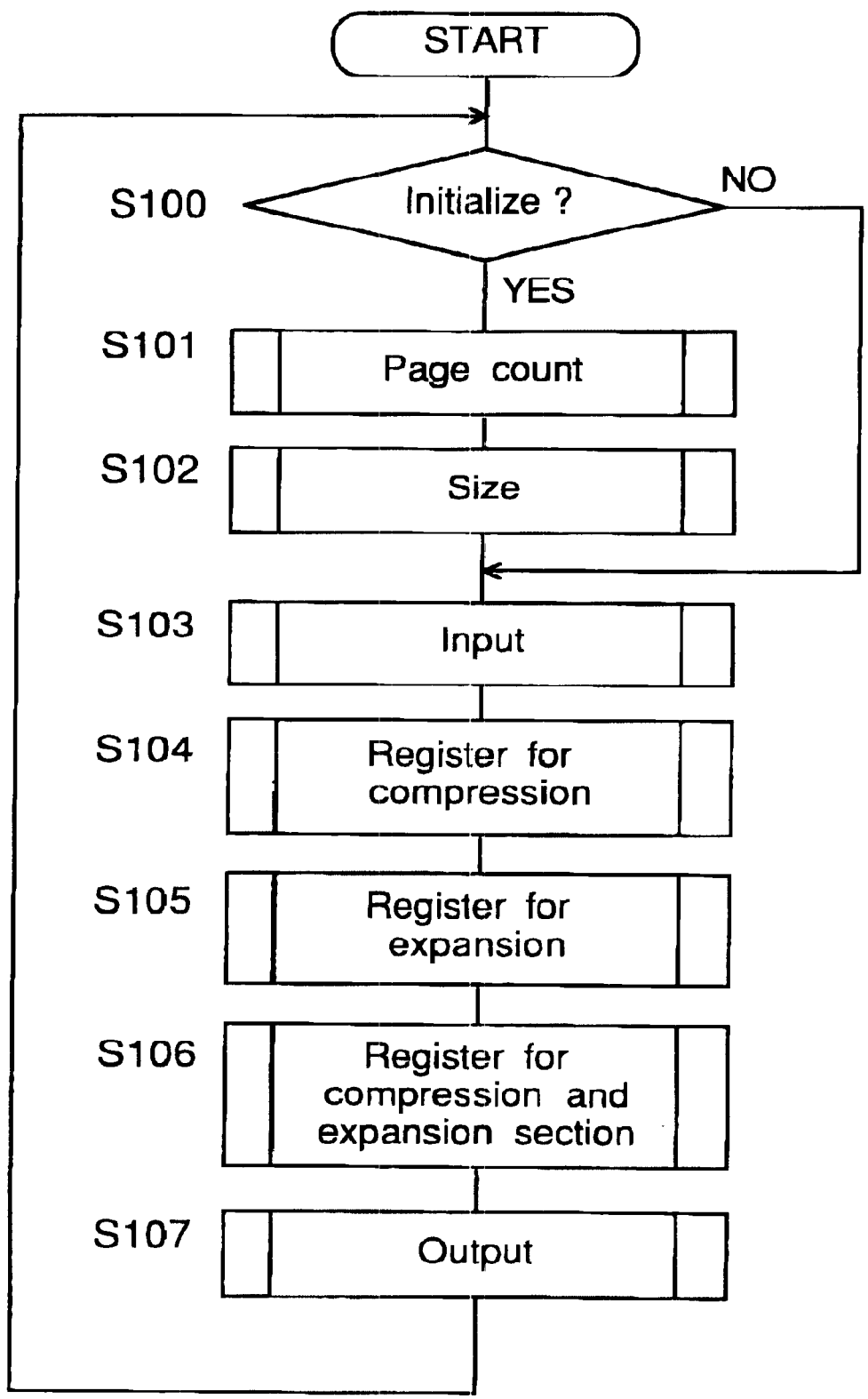
FIG. 17 is a main flowchart of the control by a CPU 503 in a memory unit.

Next, control in the memory unit 13 is explained. FIG. 17 shows a main flow chart of the control by the CPU 503 in the memory unit 13. When the start key 408 in the operation panel 400 is pressed (step S100), the memory unit 13 is initialized. That is, page count is performed to set a page count register (step S101, refer to FIG. 18), and sizes are set for the data storage areas in the input buffer memory 502 and in the output buffer memory 505 according to the size of the selected paper (step S102, refer to FIG. 19). Next, input processing is performed to change the block for writing data in the input buffer memory 502 from block A to B or vice versa (step S103, refer to FIG. 20). Then, various registers are set for performing compression in the compression/expansion processors 506–509 designated by the current mode set at step S3 in FIG. 12 (step S104, refer to FIGS. 21A and 21B). Next, various registers are set for performing expansion in the compression/expansion processors 506–509 designated for the current mode (step S105, refer to FIGS. 22A and 22B). Then, various registers in the four compression/expansion processors 506–509 are set to designate for compression and for expansion according to the current mode (step S106, refer to FIG. 24). Then, output processing is performed to change a block between block A to B and vice versa for reading page data in the output buffer memory 505 (step S107, refer to FIG. 25).

Figure 18:
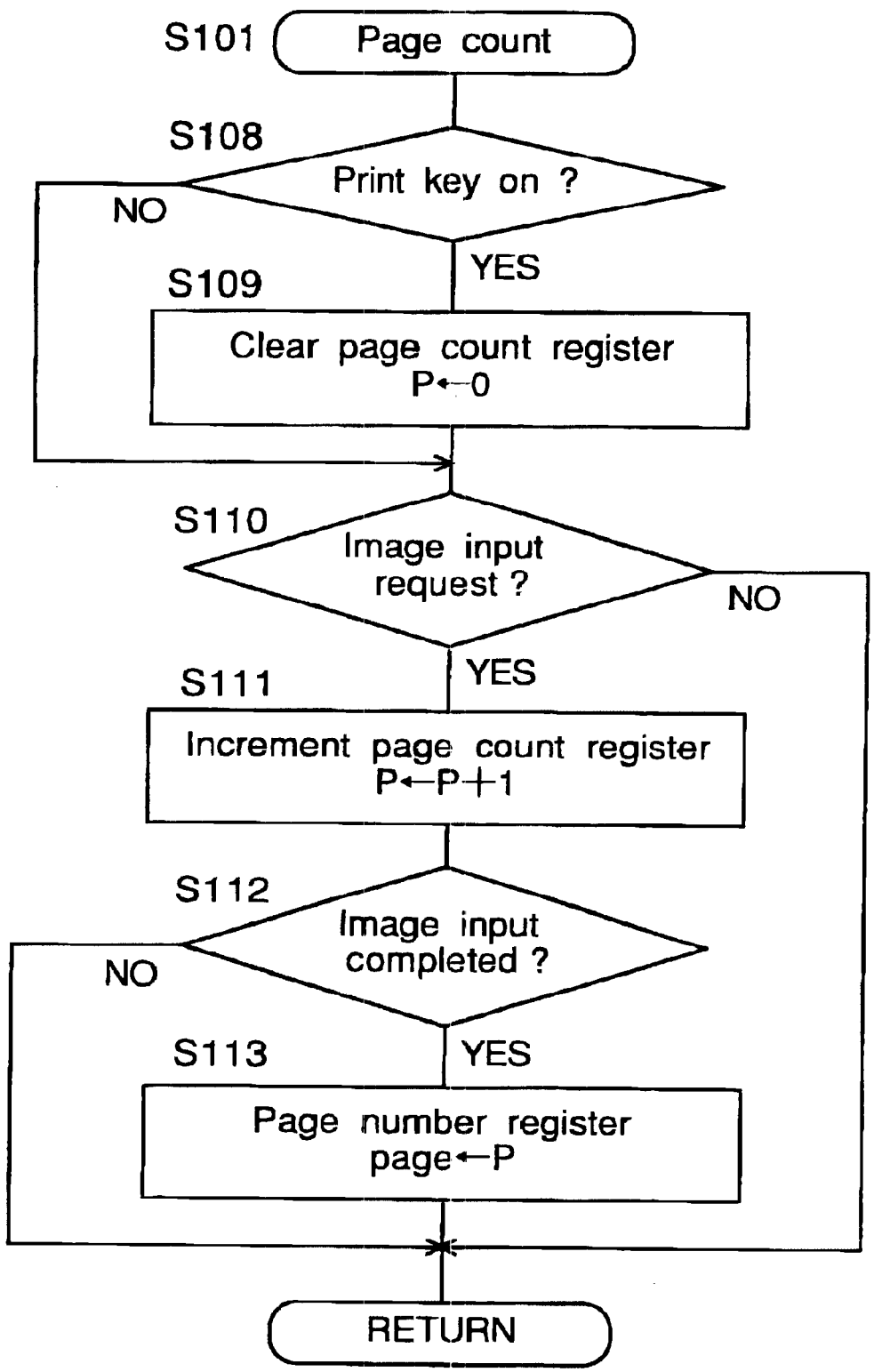
FIG. 18 is a flowchart of page count.

FIG. 18 shows a flowchart of page count (step S101 in FIG. 17). If the print key 408 is decided to be pressed (YES at step S108), a value in the page count register P is cleared to zero (step S109).

Next, if image input request is decided to be received (YES at step S110), the page count register P is incremented by one (step S111). Further, if the image input is decided to be completed (YES at step S112), the page number register P is set to a value, page, in a page number register (step S113).

Figure 19:
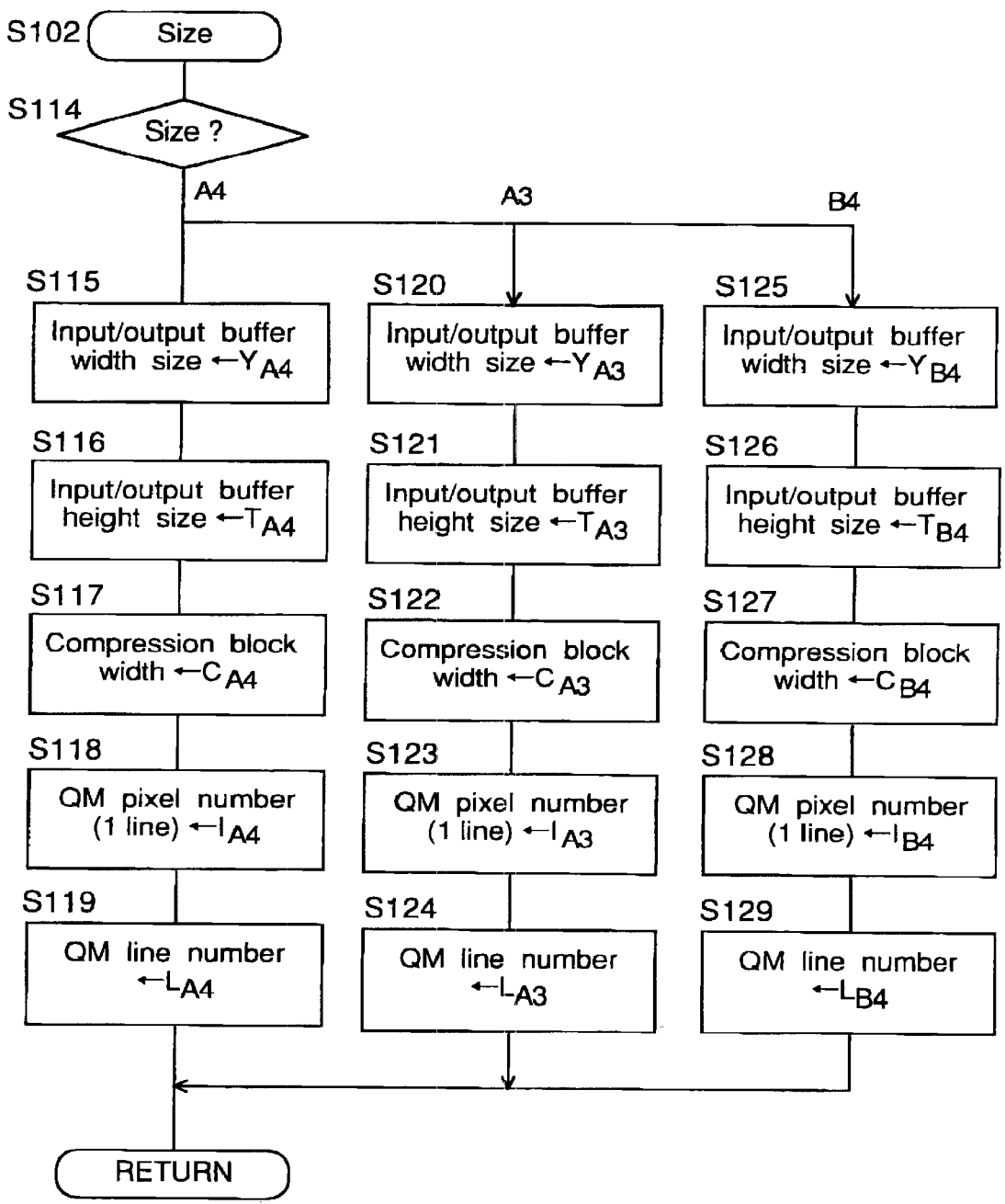
FIG. 19 is a flowchart of size setting.

FIG. 19 shows a flowchart of size setting (step S102 in FIG. 17). The flow branches according to paper size to be set for image forming (step S114). If the paper size is A4, width size and height size in the input/output buffer memories are set to $Y_{A4}$ (=3,328 dots) and to $T_{A4}$ (=4,677 dots) (steps S115 and S116), compression block width C is set to $I_{A4}$ (=832 dots) (step S117), QM pixel number in a line is set to $I_{A4}$ (step S118), and QM line number is set to $L_{A4}$ (step S119). If the paper size is A3, width size and height size in the input/output buffers are set to $Y_{A3}$ and to $T_{A3}$ (steps S120 and S121), compression block width is set to $C_{A3}$ (step S122), QM pixel number in a line is set to $I_{A3}$ (step S123), and QM line number is set to $L_{A3}$ (step S124) Similarly, If the paper size is B4, width size and height size in the input/output buffers are set to $Y_{B4}$ and to $T_{B4}$ (steps S125 and S126), compression block width is set to $C_{B4}$ (step S127), QM pixel number in a line is set to $I_{B4}$ (step S128), and QM line number is set to $L_{B4}$ (step S129).

Figure 20:
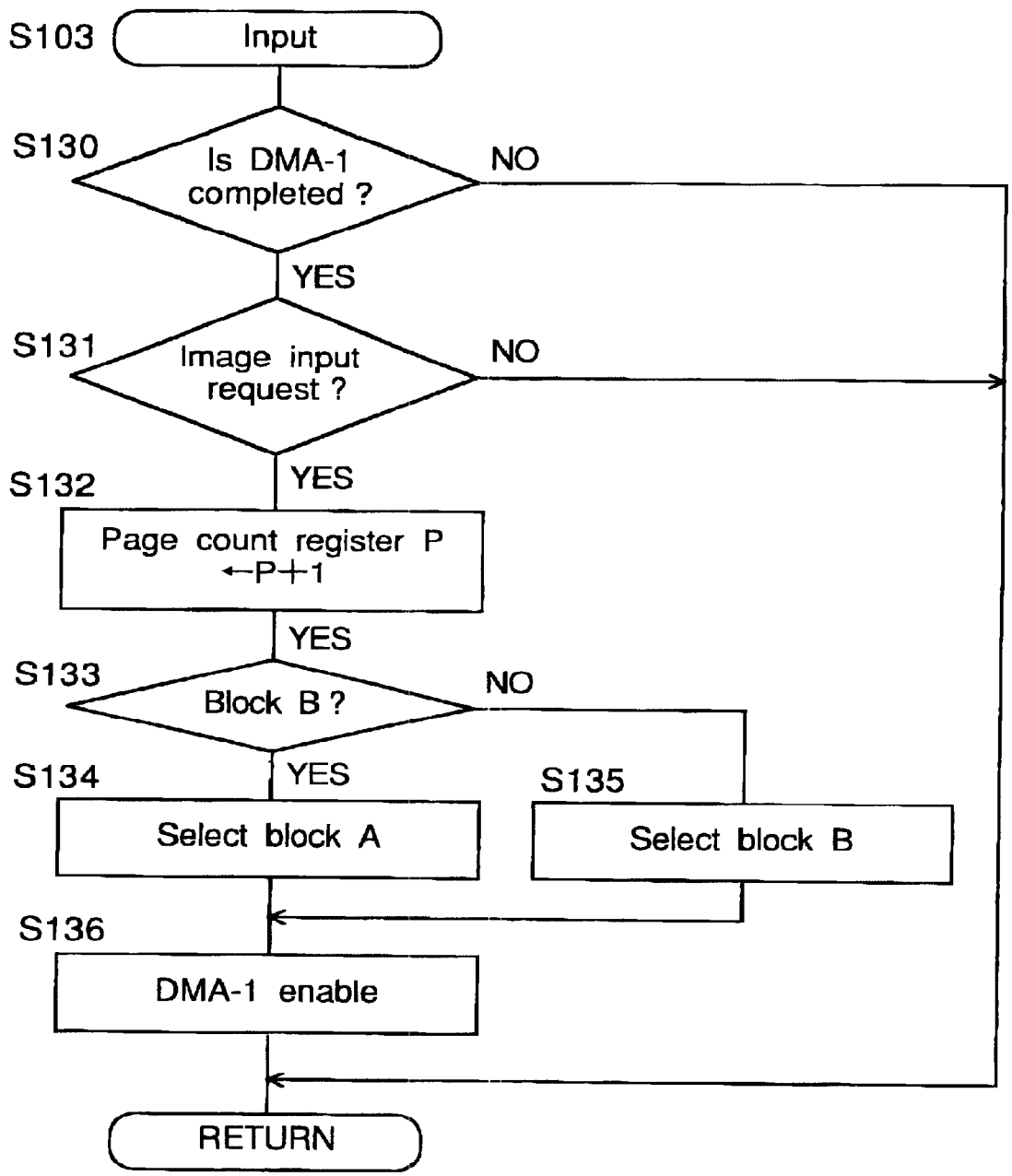
FIG. 20 is a flowchart of input processing.

FIG. 20 shows a flowchart of input processing (step S103 in FIG. 17) wherein the block in the input buffer memory 502 to which data are written is changed between block A and B to compress page data in the input buffer memory while writing next page data to the input buffer memory. If data transfer DMA-1 of one page from the input section to the input buffer memory 502 is decided to be completed (YES at step S130) and if image input of next page is decided to be requested by the image processing unit 10 (YES at step S131), page count register P is incremented by one (step S132). Then, a block to which the next page data are written is selected. If the current block selected in the previous input processing is decided to be block B (YES at step S134), block A is selected (step S134), while if the current block selected in the previous input processing is decided not to be block B (NO at step S134), block B is selected (step S135). Then, data transfer DMA-1 is enabled (step S136)

Figure 21A:
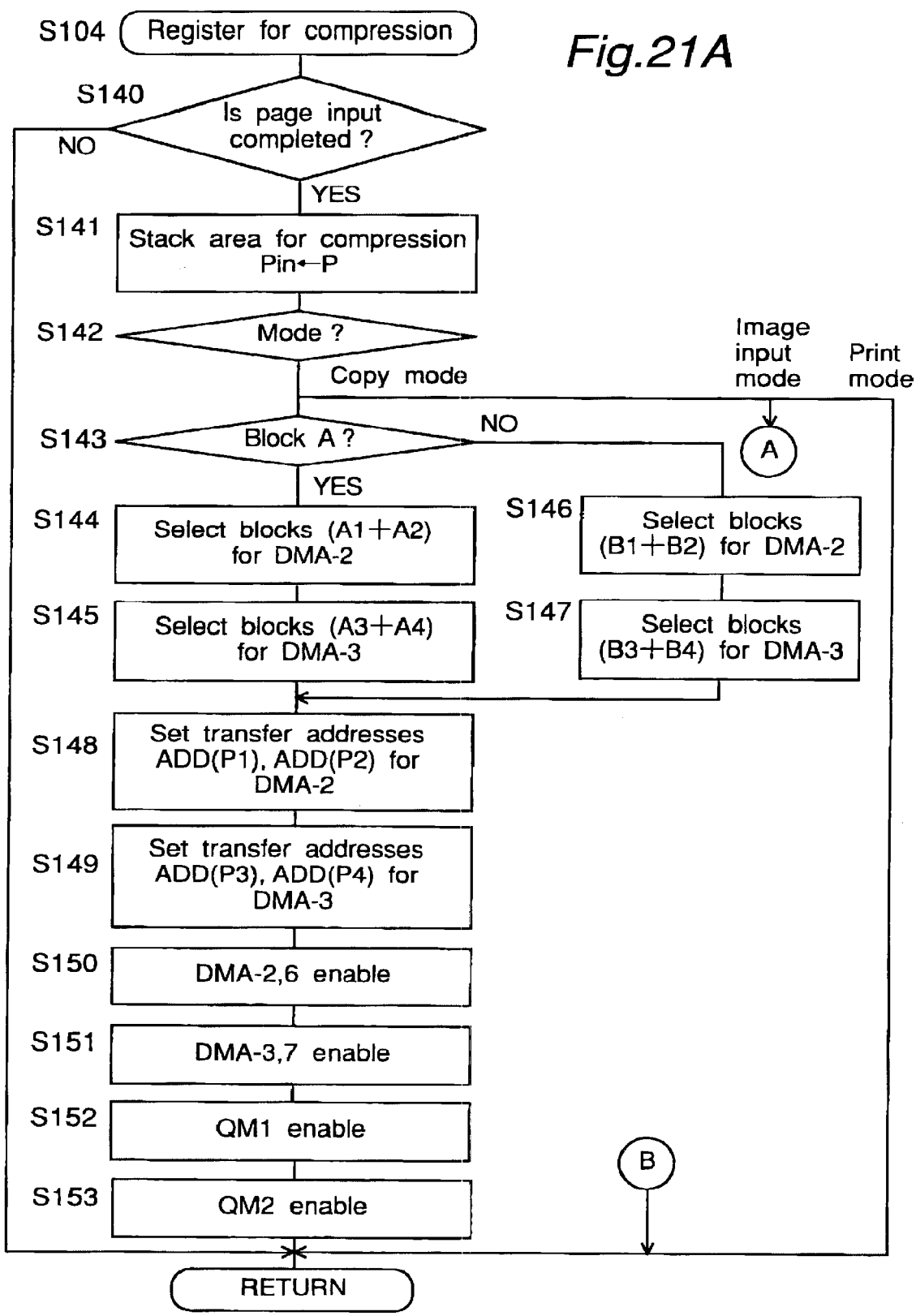
FIGS. 21A and 21B are flowcharts of setting register s for compression.
Figure 21B:
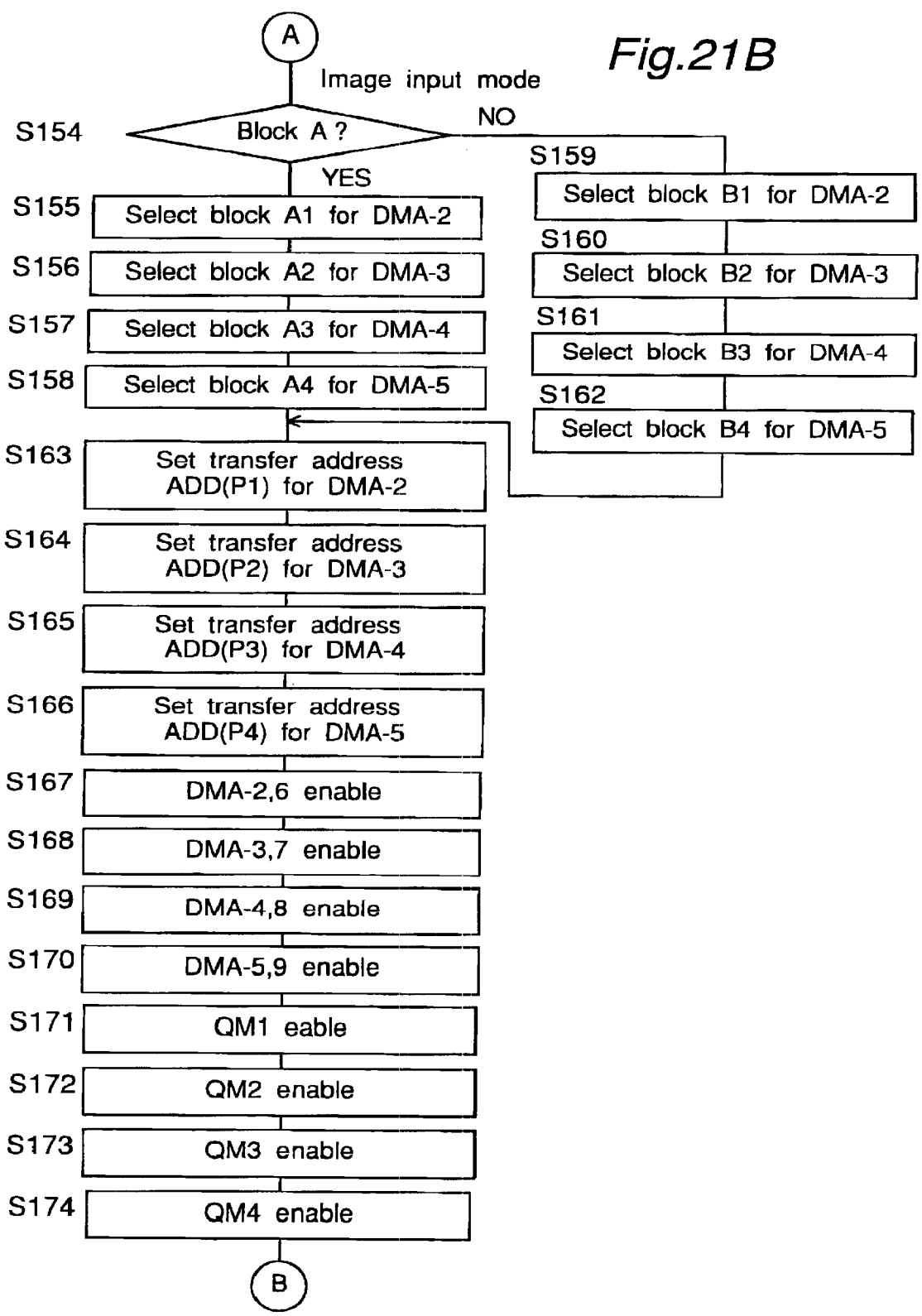

FIGS. 21A and 21B are flowcharts of setting registers for compression (step S104 in FIG. 12) wherein various registers are set for compression in the compression/expansion processors designated by the current mode set in the mode setting at step S3 in FIG. 12 such as image input mode, copy mode or print mode. After page data to be read from the input buffer memory 502 is input completely (YES at step S140), stack areas for compression are set (step S141). That is, a value of the page count register P is written to a register $P_{in}$, and compression procedure is set with reference to the value.

Then, the flow branches according to the mode (step S142). If copy mode is set, two of the four compression/expansion processors are set for data compression. If the block selected in the input processing is decided to be block A (YES at step S143), sub-blocks A1 and A2 are selected for data transfer DMA-2 from the input buffer memory 502 to the compression/expansion processor 506 (step S144), and sub-blocks A3 and A4 are selected for data transfer DMA-3 from the input buffer memory 502 to the compression/expansion processor 507 (step S145). On the other hand, if the block selected in the input processing is decided to be block B (NO at step S143), sub-blocks B1 and B2 are selected for data transfer DMA-2 from the input buffer memory 502 to the compression/expansion processor 506 (step S146), and sub-blocks B3 and B4 are selected for data transfer DMA-3 from the input buffer memory 502 to the compression/expansion processor 507 (step S147). After selection of the blocks for data transfer is completed as explained above, transfer destination addresses ADD (P1) and ADD (P2) in the code memory 511 are set for the data output from the compression/expansion processor 506 in the data transfer DMA-2 (step S148), and transfer destination addresses ADD (P3) and ADD (P4) in the code memory 511 are set for the data output from the compression/expansion processor 507 in the data transfer DMA-3 (step S148). Then, data transfer DMA-2 from the input address buffer memory 502 to the compression/expansion processor 506 and data transfer DMA-6 from the compression/expansion processor 506 to the code memory 511 are both enabled (steps S150). Further, data transfer DMA-3 from the input address buffer memory 502 to the compression/expansion processor 507 and data transfer DMA-7 from the compression/expansion processor 507 to the code memory 511 are both enabled (steps S151). Then, compression (QM1) in the compression/expansion processor 506 is enabled (step 152), and compression (QM2) in the compression/expansion processor 507 is enabled (step 153).

If print mode is set for only printing in the printer 200, no input data exists, and all the four compression/expansion processors are used for expanding code data. Therefore, registers for compression are not set, and the flow returns readily to the main flow.

If image input mode for only reading document image data in the image reader 100 is set, all the four compression/expansion processors are set for data compression for input image data. If the block selected in the input processing is decided to be block A (YES at step S154), sub-block A1 is selected for data transfer DMA-2 from the input buffer memory 502 to the compression/expansion processor 506 (step S155), sub-block A2 is selected for data transfer DMA-3 from the input buffer memory 502 to the compression/expansion processor 507 (step S156), sub-block A3 is selected for data transfer DMA-4 from the input buffer memory 502 to the compression/expansion processor 508 (step S157), and sub-block A4 is selected for data transfer DMA-5 from the input buffer memory 502 to the compression/expansion processor 509 (step S158). On the other hand, if the block selected in the input processing is decided to be block B (NO at step S154), sub-block B1 is selected for data transfer DMA-2 from the input buffer memory 502 to the compression/expansion processor 506 (step S159), sub-block B2 is selected for data transfer DMA-3 from the input buffer memory 502 to the compression/expansion processor 507 (step S160), sub-block B3 is selected for data transfer DMA-4 from the input buffer memory 502 to the compression/expansion processor 508 (step S161), and sub-block B4 is selected for data transfer DMA-5 from the input buffer memory 502 to the compression/expansion processor 509 (step S162). After selecting the sub-blocks for data transfer as explained above, transfer destination address ADD (P1) is set for the data output from the compression/expansion processor 506 to the code memory 511 in the data transfer DMA-2 (step S163), transfer destination addresses ADD (P2) is set for the data output from the compression/expansion processor 507 to the code memory 511 in the data transfer DMA-3 (step S164), transfer destination address ADD (P3) is set for the data output from the compression/expansion processor 508 to the code memory 511 in the data transfer DMA-3 (step S165), transfer destination addresses ADD (P4) is set for the data output from the compression/expansion processor 509 to the code memory 511 in the data transfer DMA-4 (step S166) Then, data transfer DMA-2 from the input address buffer memory 502 to the compression/expansion processor 506 and data transfer DMA-6 from the compression/expansion processor 506 to the code memory 511 are both enabled (steps S167), data transfer DMA-3 from the input address buffer memory 502 to the compression/expansion processor 507 and data transfer DMA-7 from the compression/expansion processor 507 to the code memory 511 are both enabled (steps S168), data transfer DMA-4 from the input address buffer memory 502 to the compression/expansion processor 508 and data transfer DMA-8 from the compression/expansion processor 508 to the code memory 511 are both enabled (steps S169), and data transfer DMA-5 from the input address buffer memory 502 to the compression/expansion processor 509 and data transfer DMA-9 from the compression/expansion processor 509 to the code memory 511 are both enabled (steps S170). Then, compression (QM1) in the compression/expansion processor 506 is enabled (step 171), compression (QM2) in the compression/expansion processor 507 is enabled (step 172), compression (QM3) in the compression/expansion processor 508 is enabled (step 173), and compression (QM4) in the compression/expansion processor 509 is enabled (step 174).

Figure 22A:
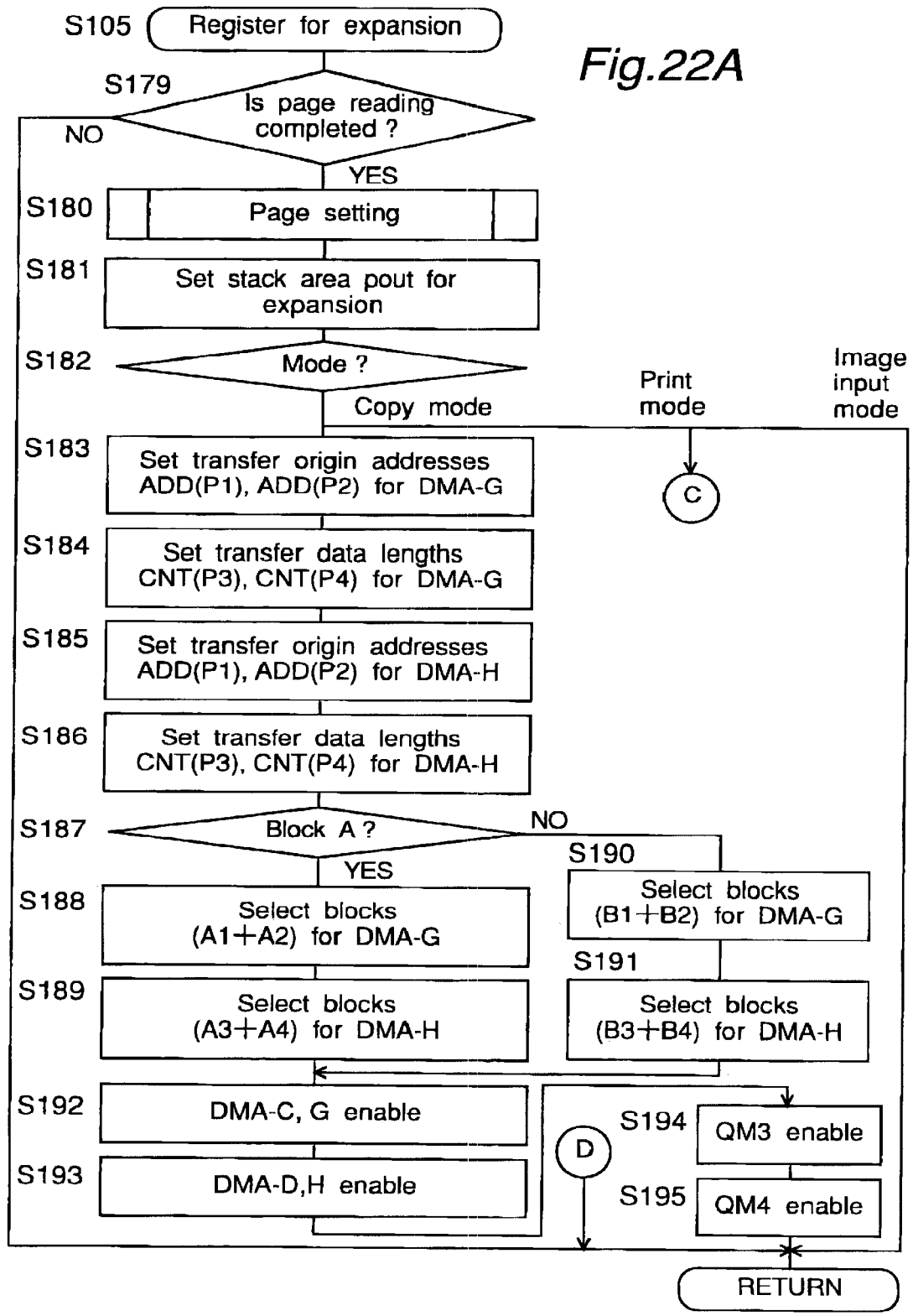
FIGS. 22A and 22B are flowcharts of setting register s for expansion.
Figure 22B:
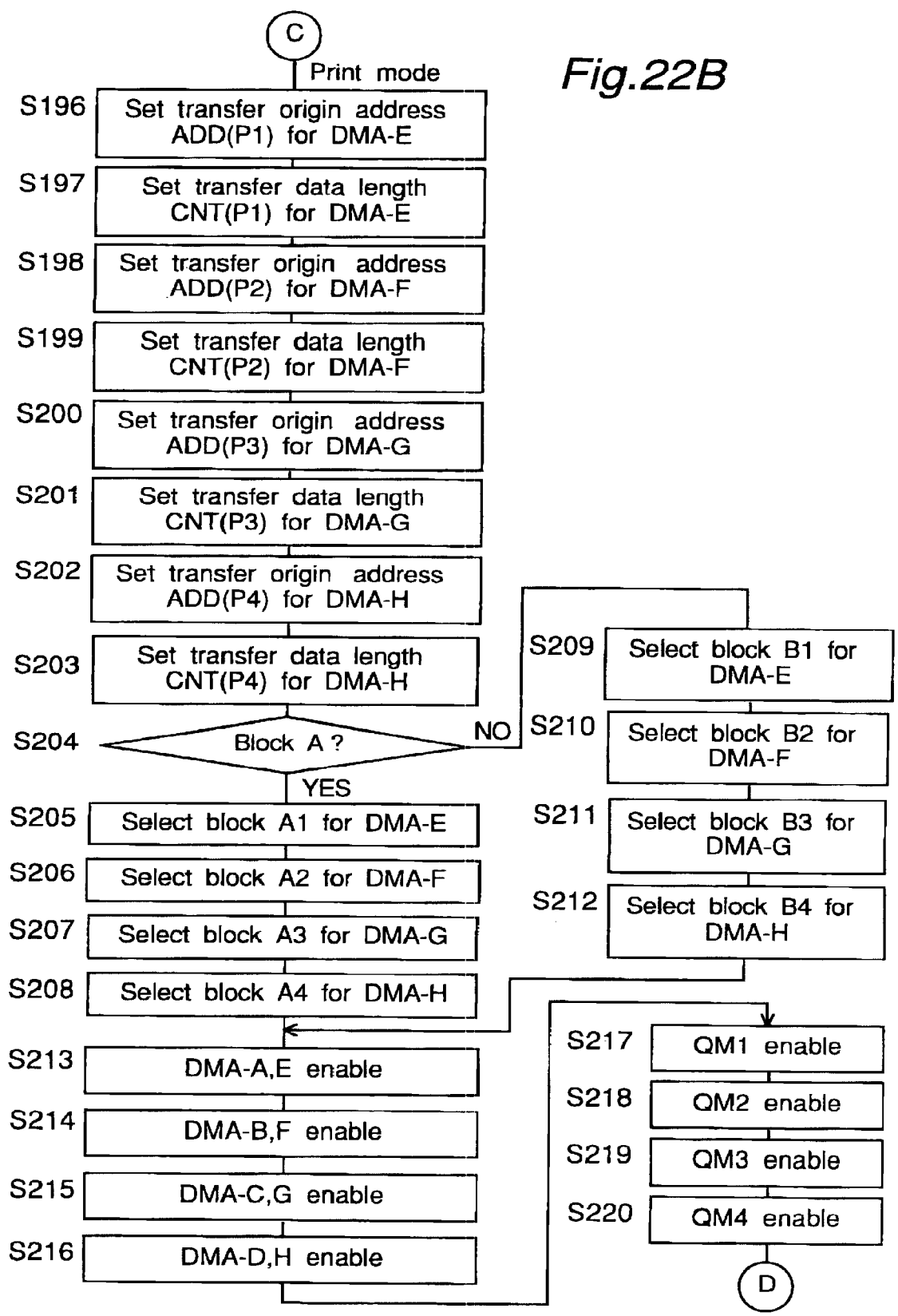

FIGS. 22A and 22B are flowcharts of setting registers for compression (step S105 in FIG. 12) wherein various registers are set for performing expansion in the compression/expansion processors designated by the current mode set in the mode setting at step S3 in FIG. 12 such as image input mode, copy mode or print mode. When reading of page data of a document put on the tray 1a is decided to be completed (step S179), page setting is performed (step S180, refer to FIG. 23). Then, the value of the page setting register PS is written to a register Pout for defining stack areas for expansion (step S180), and this is used to set addresses of sub-blocks to which expanded data are written to the output buffer memory 505.

Then, the flow branches according to the mode (step S182). If copy mode is set, two of the four compression/expansion processors are set for data expansion. First, transfer origin addresses ADD (P1) and ADD (P2) in the code memory 511 are set for data transfer DMA-G from the compression/expansion processor 508 to the output buffer memory 505 (step S183), and data lengths CNT (P1) and CNT (P2) of code data read from the code memory 511 are set (step S184). Further, transfer origin addresses ADD (P3) and ADD (P4) in the code memory 511 are set for data transfer DMA-H from the compression/expansion processor 509 to the output buffer memory 505 (step S185), and data lengths CNT (P3) and CNT (P4) of code data read from the code memory 511 are set (step S186).

Next, if the block selected in the input processing is decided to be block A (YES at step S187), sub-blocks A1 and A2 are selected for data transfer DMA-G to write expanded data to the output buffer memory 505 (step S188), and sub-blocks A3 and A4 are selected for data transfer DMA-H to write expanded data to the output buffer memory 505 (step S189). On the other hand, if the block selected in the input processing is decided to be block B (NO at step S187), sub-blocks B1 and B2 are selected for data transfer DMA-G to write expanded data to the output buffer memory 505 (step S190), and sub-blocks B3 and B4 are selected for data transfer DMA-H to write expanded data to the output buffer memory 505 (step S191).

After selecting the sub-blocks for data expansion as explained above, data transfer DMA-C from the code memory 511 to the compression/expansion processor 508 and data transfer DMA-G from the compression/expansion processor 508 to the output buffer memory 505 are both enabled (steps S192), and data transfer DMA-D from the code memory 511 to the compression/expansion processor 509 and data transfer DMA-H from the compression/expansion processor 509 to the output buffer memory 505 are both enabled (steps S193). Then, compression (QM3) in the compression/expansion processor 508 is enabled (step 194), and compression (QM4) in the compression/expansion processor 509 is enabled (step 195).

If image input mode for only reading document image data in the image reader 100 is set, no input data exists, and all the four compression/expansion processors are set for data compression. Therefore, registers for expansion are not set, and the flow returns readily to the main flow.

If print mode is set for only printing in the printer 200, all of the four compression/expansion processors are used for expanding code data. First, transfer origin address and data lengths are set for reading code data from the code memory 511. Address ADD (P1) of code data to be read from the code memory 511 is set for data transfer DMA-E from the compression/expansion processor 506 to the output buffer memory 505 (step S196), and data length CNT (P1) of code data read from the code memory 511 is set (step S197) Further, address ADD (P2) of code data to be read from the code memory 511 is set for data transfer DMA-F from the compression/expansion processor 507 to the output buffer memory 505 (step S198), and data length CNT (P2) of code data read from the code memory 511 is set (step S199). Similarly, address ADD (P3) of code data to be read from the code memory 511 is set for data transfer DMA-G from the compression/expansion processor 508 to the output buffer memory 505 (step S200), and data length CNT (P3) of code data read from the code memory 511 is set (step S201). Further, address ADD (P4) of code data to be read from the code memory 511 is set for data transfer DMA-H from the compression/expansion processor 509 to the output buffer memory 505 (step S202), and data length CNT (P4) of code data read from the code memory 511 is set (step S203).

After setting the read addresses for code data and data lengths as explained above, if the block selected in the input processing is decided to be block A (YES at step S204), sub-block A1 is selected for data transfer DMA-E to write expanded data to the output buffer memory 505 (step S205), sub-block A2 is selected for data transfer DMA-F for data transfer DMA-F to write expanded data to the output buffer memory 505 (step S206), sub-block A3 is selected for data transfer DMA-G to write expanded data to the output buffer memory 505 (step S207), and sub-block A4 is selected for data transfer DMA-H to write expanded data to the output buffer memory 505 (step S208) On the other hand, if the block selected in the input processing is decided to be block B (NO at step S204), sub-block B1 is selected for data transfer DMA-E to write expanded data to the output buffer memory 505 (step S209), sub-block B2 is selected for data transfer DMA-F for data transfer DMA-F to write expanded data to the output buffer memory 505 (step S210), sub-block B3 is selected for data transfer DMA-G to write expanded data to the output buffer memory 505 (step S211), and sub-block B4 is selected for data transfer DMA-H to write expanded data to the output buffer memory 505 (step S212).

After selection of the blocks for data transfer is completed as explained above, data transfer DMA-A from the code memory 511 to the compression/expansion processor 506 and data transfer DMA-E from the compression/expansion processor 506 to the output buffer memory 505 are both enabled (steps S213), data transfer DMA-B from the code memory 511 to the compression/expansion processor 507 and data transfer DMA-F from the compression/expansion processor 507 to the output buffer memory 505 are both enabled (steps S214), data transfer DMA-C from the code memory 511 to the compression/expansion processor 508 and data transfer DMA-G from the compression/expansion processor 508 to the output buffer memory 505 are both enabled (steps S215), and data transfer DMA-D from the code memory 511 to the compression/expansion processor 509 and data transfer DMA-H from the compression/expansion processor 509 to the output buffer memory 505 are both enabled (steps S216). Then, compression (QM1) in the compression/expansion processor 506 is enabled (step 217), compression (QM2) in the compression/expansion processor 507 is enabled (step 218), compression (QM3) in the compression/expansion processor 508 is enabled (step 219), and compression (QM4) in the compression/expansion processor 509 is enabled (step 220).

Figure 23:
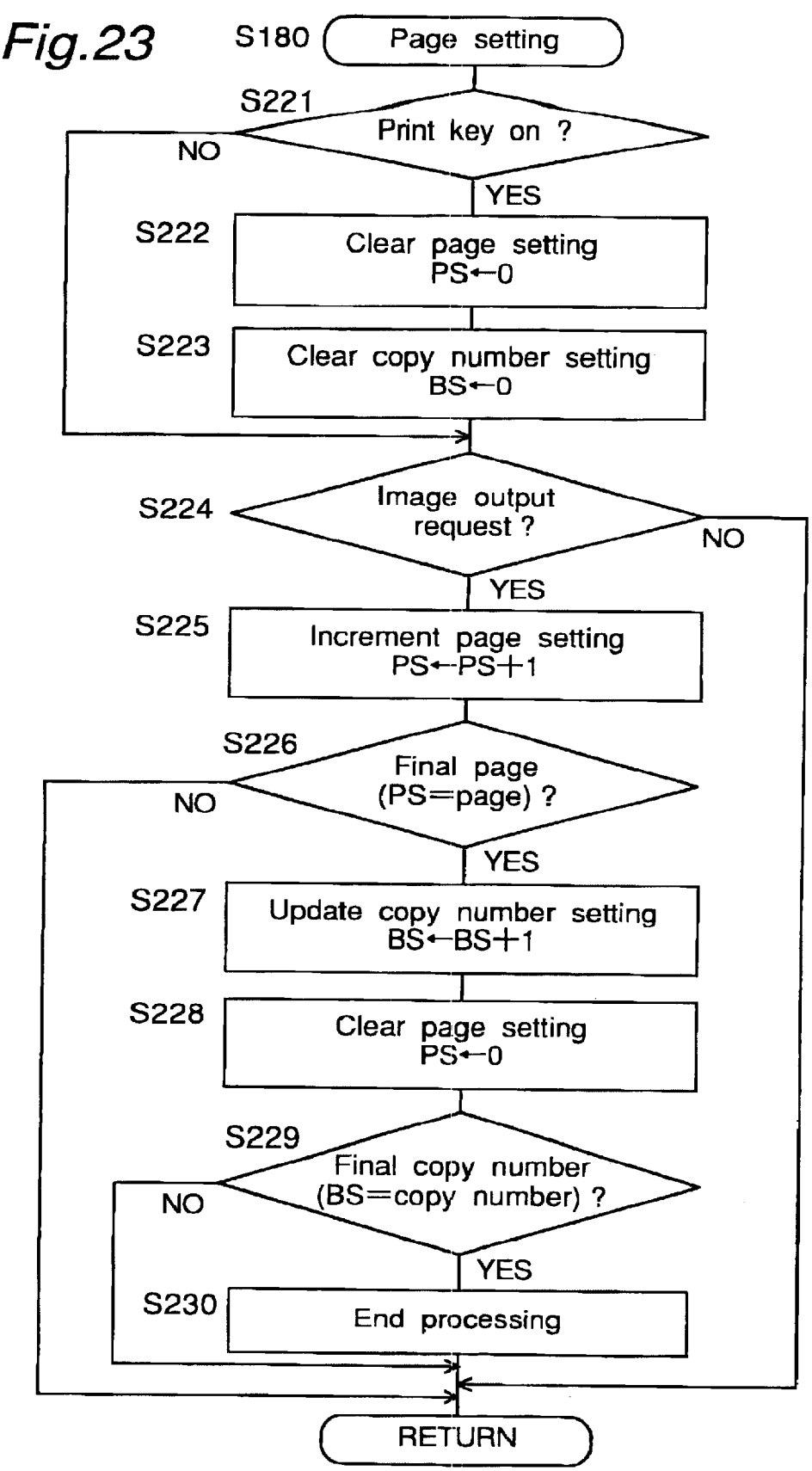
FIG. 23 is a flowchart of page setting.

FIG. 23 shows a flowchart of page setting (step S180 in FIG. 22A). When the print key 408 is decided to be pressed (YES at step S221), the value in the page setting register PS is cleared to zero (step S222), and the value in the copy number resister BS is also cleared to zero (step S223).

Next, if the image output is decided to be requested (YES at step S224), the page setting register PS is incremented by one (step S225). Then, it is decided whether the value of the page setting register PS agrees with the value, page, of page number register which have been set at step S113 in FIG. 18 or whether the current page is the final page (step S226). If the final page is processed, the copy number setting register BS is incremented by one (step S227), and the page setting register PS is cleared (step S228). Further, if the value of the copy number setting register BS is equal to the variable, copy number, which has been set with the numeral keys 407 or it is equal to the final copy number (YES at step S229), end processing is performed (step S230).

Figure 24:
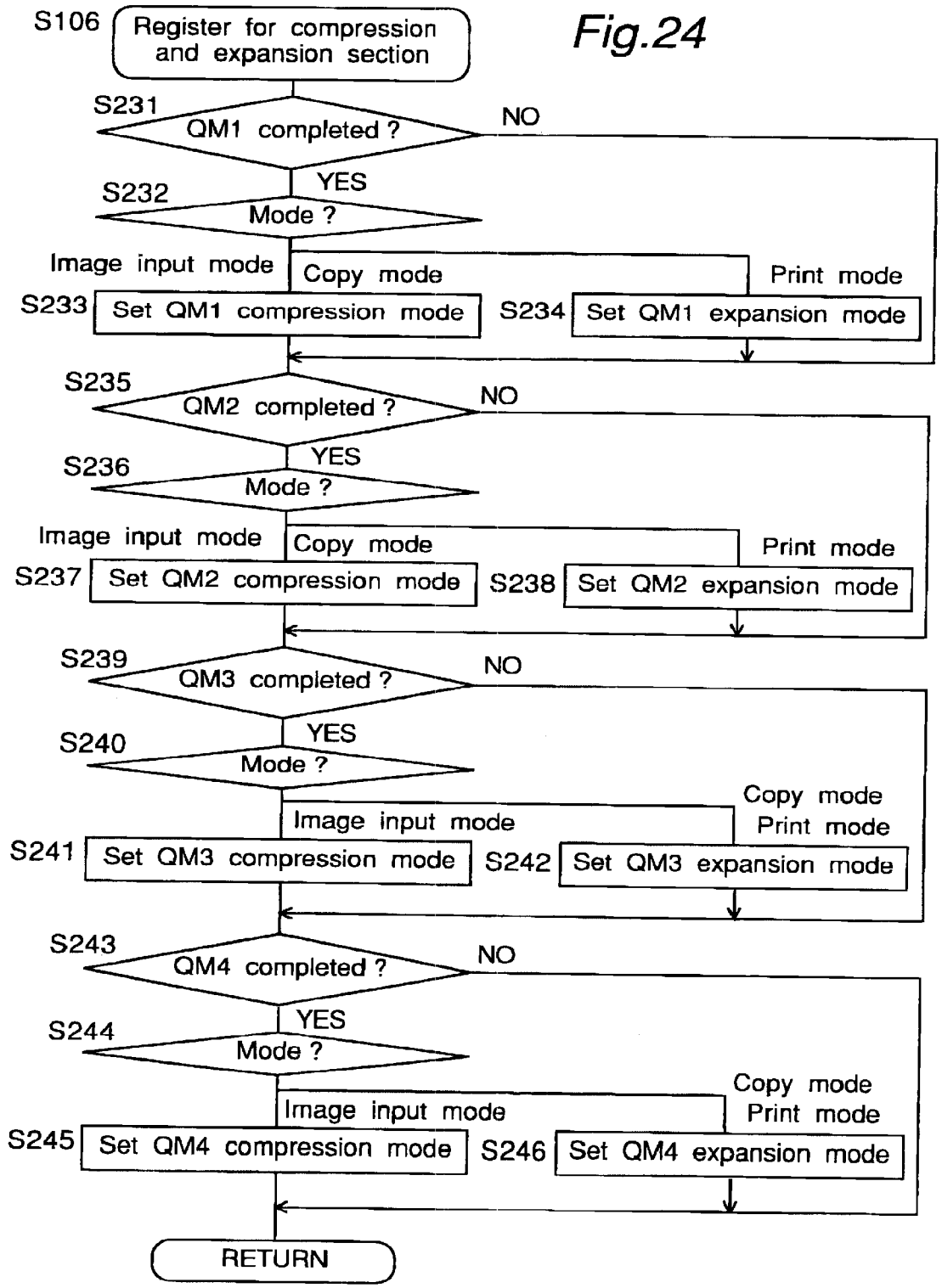
FIG. 24 shows a flowchart of setting registers in the compression/expansion processors.

FIG. 24 shows a flowchart of setting registers in the compression/expansion processors 506–509 (step S106 in FIG. 17) wherein various registers in the four compression/expansion processors are set to designate for compression and for expansion according to the current mode. If compression or expansion (QM1) in the compression/expansion processor 506 is decided to be completed (YES at step S231), the flow branches according to the mode (step S232). In image input mode or copy mode, a mode for compressing input image data is set (step S233), and in print mode, a mode for expanding code data is set (step S234).

If compression or expansion (QM2) in the compression/expansion processor 507 is decided to be completed (YES at step S235), the flow branches according to the current mode (step S236) In image input mode or copy mode, a mode for compressing input image data is set (step S237), and in print mode, a mode for expanding code data is set (step S238).

If compression or expansion (QM3) in the compression/expansion processor 508 is decided to be completed (YES at step S239), the flow branches according to the current mode (step S240). In image input mode, a mode for compressing input image data is set (step S241), and in copy mode or in print mode, a mode for expanding code data is set (step S242).

If compression or expansion (QM4) in the compression/expansion processor 509 is decided to be completed (YES at step S243), the flow branches according to the current mode (step S244) In image input mode, a mode for compressing input image data is set (step S245), and in copy mode or in print mode, a mode for expanding code data is set (step S246).

Figure 25:
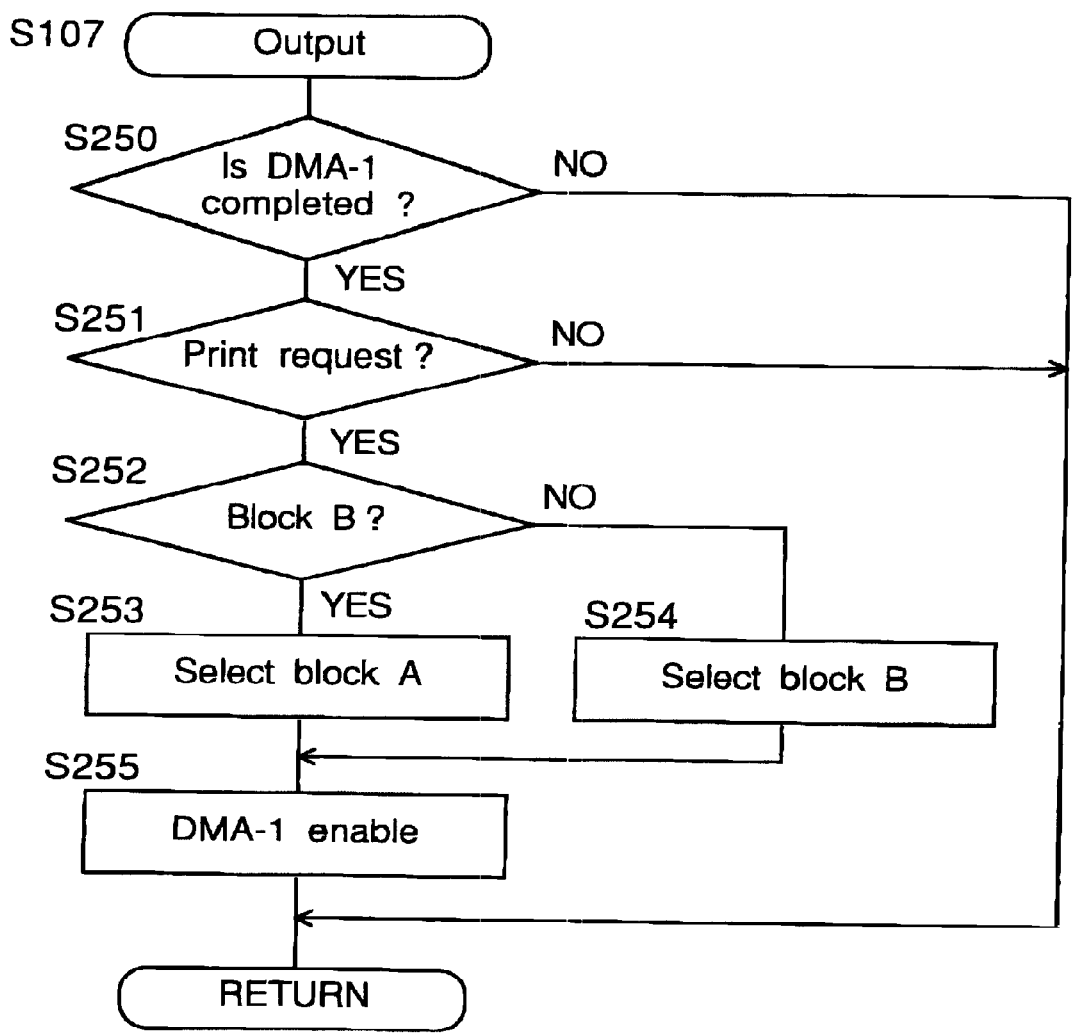
FIG. 25 is a flowchart of output processing.

FIG. 25 is a flowchart of output processing (step S107 in FIG. 12) wherein block for reading page data is changed between blocks A to B. If output processing DMA-1 of expanded data from the output buffer memory 505 to the output section (YES at step S250), and if print is requested for the printer 200 (YES at step S252), the block is changed. If block B has been selected (YES at step S252), block A is selected (step S253), while if block A has been selected (NO at step S252), block B is selected (step S254). Then, data transfer DMA-I is enabled (step S255).

Figure 2:
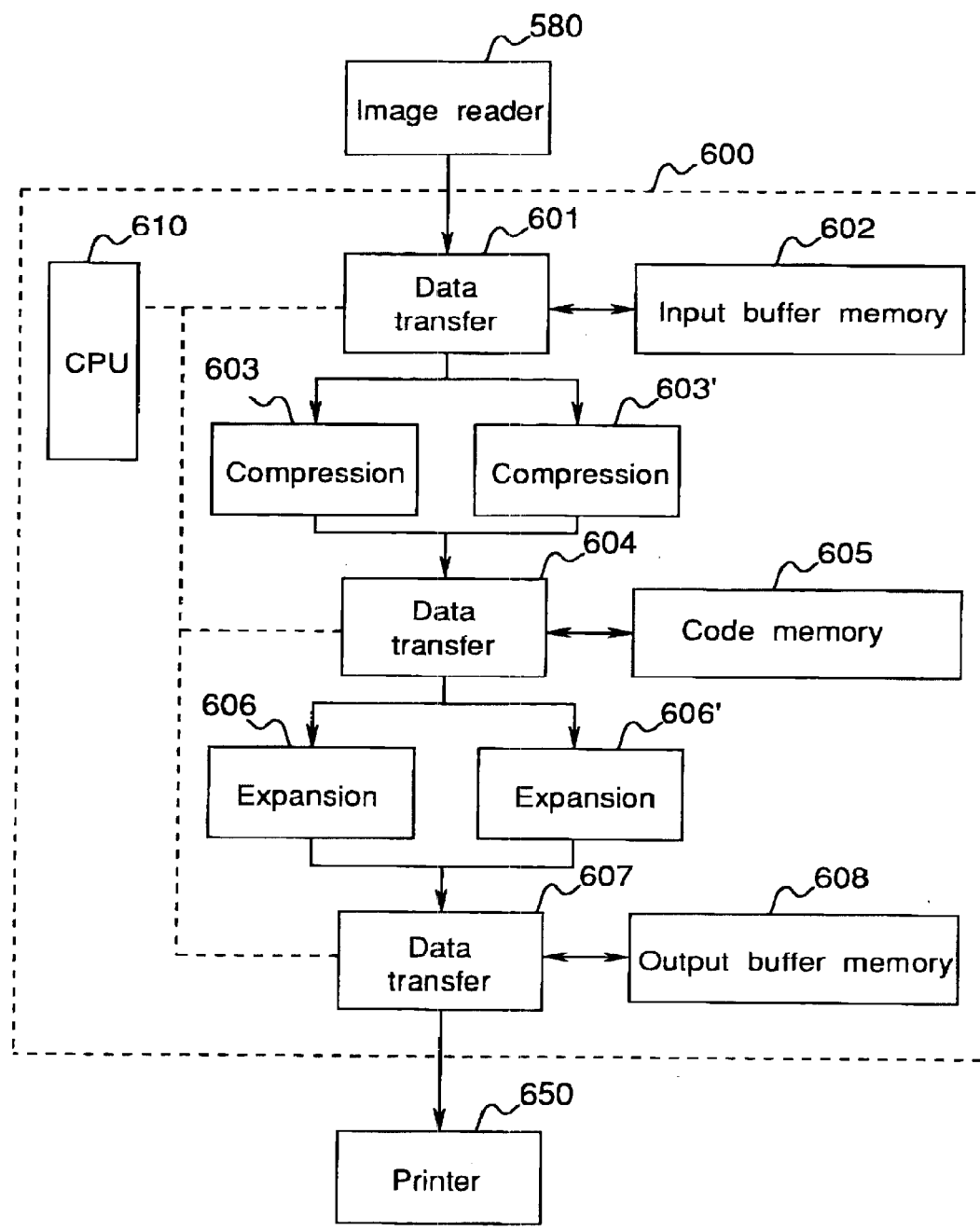
FIG. 2 is a block diagram of another prior art compression/expansion processor.

As explained above, in the memory unit 13 explained above, all the compression/expansion processors can be used in any mode in image input mode, copy mode and print mode. The number of compression/expansion processors used for compression and that used for expansion are changed between modes when image data are only input, when image data are input and read at the same time and when image data are only read. Then, when data are input or output, all the compression/expansion processors provided in an apparatus can be used efficiently. Thus, use efficiency of the compression/expansion processors is improved, and an overall processing speed is increased. Especially, the processing speed is improved when only data input is performed and when only data read are performed in data transfer. If the memory unit 13 is compared with the prior art apparatus shown in FIG. 2, the processing speed is doubled in image input mode and in print mode though the number of compression/expansion processors are the same. Thus, cost performance of the apparatus for compression/expansion is also improved.

Though four compression/expansion processors are used in the above-mentioned memory unit 13, the control of the basic data transfer is the same even if the number of the compression/expansion processors is changed to, for example, two or eight.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A compression and expansion apparatus comprising:
 a plurality of compression/expansion processors which compress or expand image data, said compression/expansion processors being connected in parallel;
 a data transfer controller which controls data transfer with said plurality of compression/expansion processors; and
 a setter which sets each of said plurality of compression/expansion processors for compression or expansion according to input data transferred under control by said data transfer controller, wherein
 said setter can set one compression/expansion processor to compress the image data and can set a different compression/expansion processor to expand the compressed image data.

2. The apparatus according to claim 1, wherein said setter performs the setting according to an amount of data to be compressed and an amount of data to be expanded.

3. The apparatus according to claim 1, wherein said setter performs the setting of each of said plurality of compression/expansion processors according to an operation.

4. The apparatus according to claim 3, wherein the operation mode is set through a user interface by a user.

5. The apparatus according to claim 4, further comprising an operation panel to set the operation mode through the user interface.

6. The apparatus according to claim 1, further comprising;
 an image reader which reads an image and sends the read data to said plurality of compression/expansion processors;
 a memory device which stores data compressed by said plurality of compression/expansion processors and sends data to be expanded to said plurality of compression/expansion processors; and
 a printer which forms an image on a recording medium based on data expanded by said plurality of compression/expansion processors.

7. The apparatus according to claim 6, wherein said setter changes setting for said plurality of compression/expansion processors for compression or expansion while said printer forms an image read by said image reader.

8. The apparatus according to claim 6, wherein said printer has a mode of forming a plurality of copies of the same image read by said image reader, and in the mode of forming a plurality of copies, said setter sets each of said plurality of compression/expansion processors for compression or expansion in a predetermined ratio while said image reader reads an image and sets all of said plurality of compression/expansion processors for expansion after said image reader completes to read the image.

9. A method for compressing and expanding data by using a plurality of compression/expansion processors which compress or expand image data, comprising the steps of:
 setting each of said plurality of compression/expansion processor for compression or expansion;
 transfering data to said compression/expansion processors which have been set for compression, and compressing the transferred data by said compression/expansion processors;
 storing data compressed by said compression/expansion processors in a memory device;
 transferring data from the memory device to said compression expansion processors which have been set for expansion; and
 expanding the data transferred from the memory device by said compression/expansion processors, wherein
 data compressed by one compression/expansion processor and stored in the memory device can be transferred from the memory device to a different compression/expansion processor for the step of expanding.

10. The method according to claim 9, wherein each of said plurality of compression/expansion processors are reset to perform compression or expansion according to an amount of data to be compressed and an amount of data to be expanded.

11. The method according to claim 10, wherein the operation of compression or expansion set for each of said plurality of compression/expansion processors is changed when an amount of data to be compressed and an amount of data to be expanded are changed.

12. A compression and expansion apparatus conpresing:
   a plurality of compression/expansion processors which compress or expand input data, said compression/expansion processors being connected in parallel;
   a controller which designates compression/expansion processors of a number in correspondence to an amount of input/output data for compression in said plurality of compression/expansion processors and designates the remaining compression/expansion processors for expansion;
   a first data transfer device which divides input data and transfers them to said compression/expansion processors designated to perform compression;
   a common memory device which stores data compressed by each said compression/expansion processors designated to perform compression;
   a second data transfer device which divides data read from said memory and transfers the read data to said compression/expansion processors designated for expansion;
   an output device which synthesizes data expanded by said compression/expansion processors to a continuous data to be output, wherein
   the second data transfer divice transfers the read data to a compression/expansion processor for expansion of said read data that is different from the compression/expansion processor that compressed the data.

13. A compression and expansion apparatus comprising:
   a plurality of compression/expansion processors for performing one of compression or expansion of data in an alternative manner, said compression/expansion processors being connected in parallel; and
   a setter for setting a part of said plurality of compression/expansion processors for compression and for setting the remaining compression/expansion processors for expansion, based on an amount of data to be compressed and an amount of data to be expanded.

14. A method for compressing and expanding data, the method comprising the steps of:
   providing a plurality of compression/expansion; processors for performing one of compression or expansion of data in an alternative manner, said compression/expansion processors being connected in parallel; and
   setting a part of said plurality of compression/expansion processor for compression and setting the remaining compression/expansion processors for expansion, based on an amount of data to be expand and an amount of data to be compressed.

15. A compression and expansion apparatus comprising:
   a plurality of compression/expansion processors for performing one of compression or expansion of data in an alternative manner, said compression/expansion processors being connected in parallel;
   a mode setter for setting one of three modes, said three modes comprising a first mode for inputting data, a second mode for outputting data and a third mode for inputting and outputting data; and
   a controller for changing the number of said plurality of compression/expansion processors which are to compress data, based on the mode set by said mode setter.

16. A method for compressing and expanding data, the method comprising the steps of:
   providing a plurality of compression/expansion processors for performing one of compression or expansion of data in an alternative manner, said compression/expansion processors being connected in parallel;
   setting one of three modes, said three modes comprising a first mode for putting data, a second mode for outputting data and a third mode for inputting and outputting data; and
   changing the number of said plurality of compression/expansion processors which are to compress data, based on the mode set by said mode setter.

* * * * *